United States Patent [19]
Abraham et al.

[11] Patent Number: 5,978,568
[45] Date of Patent: Nov. 2, 1999

[54] METHOD AND APPARATUS FOR RESOLVING NETWORK USERS TO NETWORK COMPUTERS

[75] Inventors: Dalen M. Abraham, Redmond; Todd A. Barnes, Snohomish; Mark G. Grieve, Bellevue, all of Wash.

[73] Assignee: Sequel Technology Corporation, Bellevue, Wash.

[21] Appl. No.: 08/826,598

[22] Filed: Apr. 3, 1997

Related U.S. Application Data

[60] Provisional application No. 60/040,424, Mar. 11, 1997.

[51] Int. Cl.[6] .................................................. G06F 13/00
[52] U.S. Cl. .................................................. 395/200.54
[58] Field of Search .................... 364/DIG. 1 MS File, 364/DIG. 2 MS File; 707/10; 395/200.3, 200.33, 200.47, 200.48, 200.5, 200.51, 200.52, 200.53, 200.54, 200.75

[56] References Cited

U.S. PATENT DOCUMENTS

| | | | |
|---|---|---|---|
| 5,347,633 | 9/1994 | Ashfield et al. | 395/200.68 |
| 5,377,323 | 12/1994 | Vasudevan | 395/200.56 |
| 5,425,028 | 6/1995 | Britton et al. | 395/200.58 |
| 5,742,769 | 4/1998 | Lee et al. | 395/200.36 |
| 5,813,006 | 9/1998 | Polnerow et al. | 707/10 |

OTHER PUBLICATIONS

"Traffic Reduction of Name Server Lookups over Low–Bandwidth Connections,"IBM Technical Disclosure Bulletin, Vol. 39, No. 12, Dec. 1996, pp. 221–222.

W. Doeringer, D. Dykeman, M. Peters, H. Sandick, K. Vu, J. Derby, "Access Architecture for a Multiprotocol Broadband Backbone,"*Computer Networks and ISDN Systems*, Vol. 29, No. 2, Jan. 1997, pp. 137–155.

*Primary Examiner*—Robert B. Harrell
*Attorney, Agent, or Firm*—Christensen O'Connor Johnson & Kindness PLLC

[57] ABSTRACT

A naming service manager (46) is provided for resolving mapping information regarding a plurality of computers connected to a local area network (LAN 24) and their users. The naming service manager 46 collects mapping information, i.e., user login names, domain names, computer names and IP addresses, from a plurality of naming service agents 50 located on the LAN (24) and correlates the mapping information into a current computer-to-user assignment or "mapping" for each user of the LAN 24 and/or a current IP address-to-computer assignment or "mapping" for each computer connected to the LAN 24. The naming service manager (46) serves the correlated mapping information to a plurality of naming service applications (48) which process the correlated mapping information in accordance with their own needs and requirements.

52 Claims, 20 Drawing Sheets

METHOD AND APPARATUS FOR RESOLVING NETWORK USERS TO NETWORK COMPUTERS

RELATIONSHIP TO OTHER APPLICATIONS

This application claims the benefit of U.S. Provisional Application Ser. No. 60/040,424 filed Mar. 11, 1997. The subject matter of Provisional Application Ser. No. 60/040,424 is incorporated herein by reference.

FIELD OF THE INVENTION

This invention generally relates to a communications network interconnecting a number of computers and associated electronic devices and, more particularly, to a method and apparatus for identifying and correlating users of the network with currently utilized network computers and devices.

BACKGROUND OF THE INVENTION

Networks for connecting together a number of computers and associated electronic devices are now commonplace in a wide variety of environments. Networks may vary in size, from a local area network (LAN) consisting of a few computers and related devices, to a wide area network (WAN) which interconnects computers and LANs that are geographically dispersed. An internetwork, in turn, is the joining of multiple computer networks, both similar and dissimilar, by means of gateways or routers that facilitate data transfers and conversion from various networks. A well-known abbreviation for internetwork is "Internet." As currently understood, the capitalized term Internet refers to the collection of networks and routers that use a "Transmission Control Protocol/Internet Protocol (TCP/IP) to communicate with one another.

Virtually any electronic device or computer equipped with the necessary hardware can be connected to a LAN or a WAN and hence, to the Internet. Each computer and device that is connected to the Internet has an Internet Protocol address ("IP address") that uniquely identifies the computer or device from all other computers and devices on the Internet. An IP address is comprised of four groups of numbers separated by decimals, for example, 165.113.245.2. Each computer connected to the Internet also has a computer name or "host name" that is assigned to the computer at its particular IP address. For example, the name "abc" can be assigned to a computer having the IP address 165.113.245.2. In turn, the computer name is embedded in what is known as a "fully qualified domain name" that uniquely identifies a computer connected to the Internet in a more user friendly manner. In its most generic form, a fully qualified domain name consists of three elements: The host name, the assigned domain name, and a top-level domain name. For example, a computer connected to the Internet may have the fully qualified domain name "abc.sequeltech.com", which includes the host name ("abc"), the domain name ("sequeltech"), and the and the top-level domain name ("com").

Fully qualified domain names are translated into numeric IP addresses and vice versa by domain name servers connected to the Internet. A domain name server is a computer containing software capable of responding to domain name inquiries and accessible on a full-time basis to other computers on the Internet. However, domain name servers do not maintain or keep track of individual computer name to IP address assignments within those networks making up the Internet. This function is provided by a domain controller server, i.e., a computer connected to a network that contains the software capable of keeping track of the computer name and IP address of each computer connected to the network.

In the traditional network environment, network users are statically assigned or "mapped" to a particular computer at a particular IP address, computer name or domain name using various application program interfaces. Consequently, network resources, such as electronic mail, peripheral devices, CD-ROM libraries, etc. are made available, assigned or applied to users at the computers to which the users are assigned or mapped. However, if a user utilizes a computer connected to the network to which the user is not assigned or mapped, the network resources specifically intended for that user are not made available, assigned or applied to that computer. Rather, the network resources intended for that user remain with the computer to which the user is formally assigned, and the network resources applied to the computer currently being utilized by the user are those made available, assigned and applied to another user that is formally assigned to that computer.

Accordingly, a method and apparatus for resolving network users to network computers is needed so that as users log into and out of different computers connected to the network, the network resources intended for that user are applied to that user. The method and apparatus should be able to identify all computers currently being utilized by a specified user and identify which user is currently utilizing which computer. Further, the method and apparatus should keep track of which IP address is currently assigned to which computer. The method and apparatus should also allow for both dynamic and static resolution of network users to network computers. More specifically, the method and apparatus should provide for static or "permanent" user-to-computer and/or computer-to-IP address assignments as well as dynamic user-to-computer and/or computer-to-IP address assignments which change as users log into and out of computers connected to the network or as IP addresses change. Finally, the method and apparatus should be completely transparent to the users of the network. As described in the following, the present invention provides a method and apparatus that meet these criteria.

SUMMARY OF THE INVENTION

In accordance with the present invention, a method and apparatus are provided for resolving mapping information regarding a plurality of computers interconnected by a communications medium to form a network. More specifically, a naming service manager maintains mapping information regarding each computer connected to the network in a data storage structure. The naming service manager updates the mapping information maintained in the data storage structure with updated mapping information gathered and communicated to the manager by at least one naming service agent. After updating the mapping information maintained in the data storage structure, the naming service manager communicates the updated mapping information to at least one naming service application. The application processes the mapping information in accordance with its own application requirements.

In accordance with other aspects of the present invention, the mapping information communicated by the naming service agent to the naming service manager, and the mapping information communicated by the naming service manager to the naming service application is stored in a transaction container.

A method including elements general consistent with the functions implemented by the manager, agent and application described above represents a further aspect of this invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
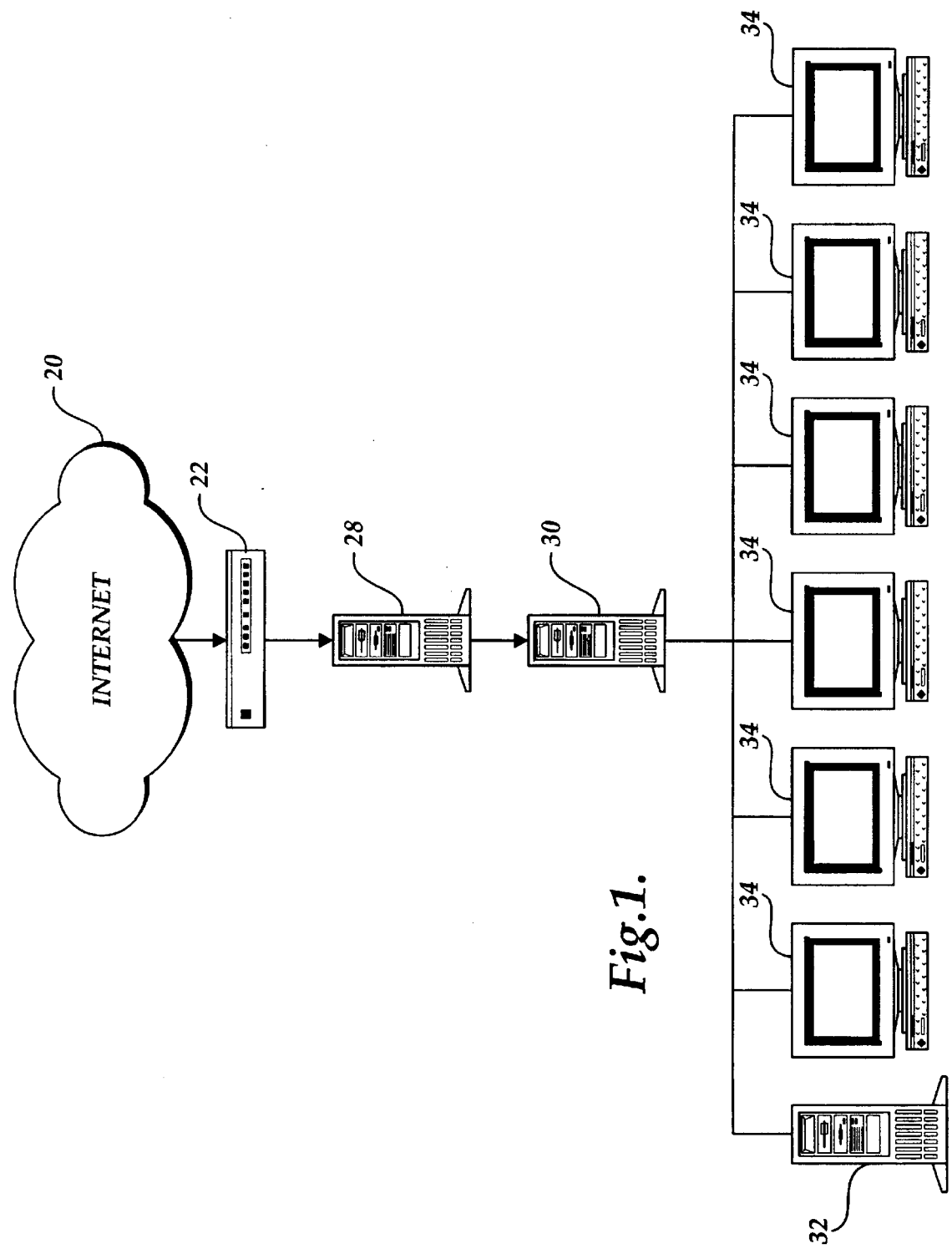
FIG. 1 is a pictorial diagram of a plurality of computers interconnected to form a local area network (LAN) that is connected to the Internet.

FIG. 1 illustrates in more detail a local area network (LAN) 24 connected to the Internet 20 that is equipped with the present invention. In the actual embodiment of the present invention depicted in FIG. 1, the LAN 24 is a bus network interconnecting various computers, including clients and servers. The LAN 24 shown in FIG. 1 can be formed of various coupling media such as glass or plastic fiberoptic cables, coaxial cables, twisted wire pair cables, ribbon cables, etc. In addition, one of ordinary skill in the art will appreciate that the coupling medium can also include a radio frequency coupling media or other intangible coupling media. In view of the availability of preinstalled wiring in current commercial environments, twisted wire pair copper cables are used to form the LAN 24 in the actual embodiment of the present invention described herein.

As shown in FIG. 1, the computers interconnected by the LAN 24 include a plurality of client computers 34,a domain controller server 32, a network server 30 and a firewall server 28. The domain controller server 32 keeps track of which users are logged into which computers at any given time. For example, when a user logs in to a client computer 34 and the computer begins actively communicating with the LAN 24, the client computer 34 is said to have started a "session" with the LAN 24. The domain controller server 32 captures a record of this session and stores the login name of the user and the computer name of the computer logged into by the user.

As opposed to the domain controller server 32, the firewall server 28 insulates the remaining computers connected to the LAN 24 from malicious data packets being sent to destinations in the LAN 24 from the Internet 20. All inbound data packet traffic allowed by the firewall 28 and all outbound traffic to the Internet 20, passes through the network server 30 which is equipped with a network operating system that coordinates the transfer of inbound and outbound data packets. In one actual embodiment of the present invention, the network operating system installed on the network server 30 is Microsoft Windows NT. However, those of ordinary skill in the art will recognize that various other suitable network operating systems may be used, including the UNIX based network operating systems. As will be described in more detail below, the network server 30 is also equipped with a network service manager 46 that collects, maintains and serves mapping information, which identifies and correlates network users with the computers connected to the LAN 24 and correlates IP addresses to computers connected to the LAN 24 in accordance with the present invention.

Relevant Network Components

Figure 2:
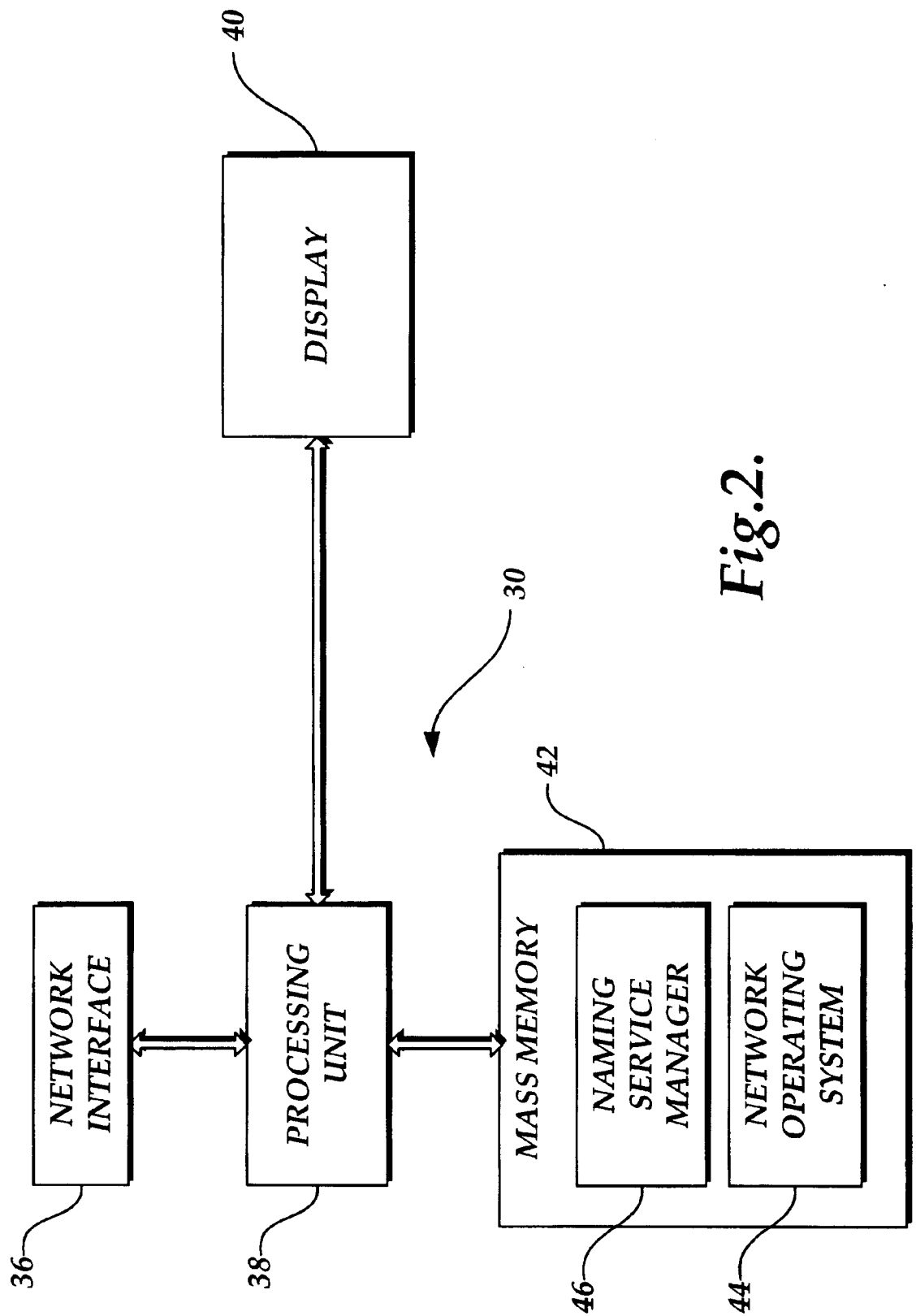
FIG. 2 is a block diagram of the several components of a network server equipped with a naming service manager that collects, maintains, and serves mapping information which identifies and correlates network users with computers connected to the LAN in accordance with the present invention.

FIG. 2 depicts several of the key components of the network server 30 used to implement the present invention. It will be appreciated by those of ordinary skill in the art that the network server 30 includes many more components than those shown in FIG. 2. However, it is not necessary that all of these generally conventional components be shown in order to disclose an illustrative embodiment for practicing the present invention. As shown in FIG. 2, the network server 30 is connected to the LAN 24 via a network interface 36. Those of ordinary skill in the art will appreciate that the network interface 36 includes the necessary circuitry for connecting the network server 30 to the LAN 24 and the firewall server 28, and is constructed for use with the TCP/IP protocol, the bus network configuration of LAN 24 and a particular type of coupling medium.

The network server 30 also includes a processing unit 38, a display 40 and a mass memory 42. The mass memory 42 generally comprises a random access memory (RAM), read only memory (ROM), and a permanent mass storage device, such as a hard disk drive, tape drive, optical drive, floppy disk drive, or combination thereof. The mass memory 42 stores the program code and data necessary for collecting, maintaining and serving mapping information in accordance with the present invention. More specifically, the mass memory 42 stores the naming service manager 46 which collects, maintains and serves mapping information for all of the computers connected to the LAN 24 and their users. The naming service manager 46 collects user mapping information, i.e., user login names, domain names, computer names and IP addresses, from a plurality of naming service agents 50 and correlates the mapping information into a current computer-to-user assignment or "mapping" for each user of the LAN 24. The naming service manager 46 then provides or serves the correlated mapping information to naming service applications 48 which require such information.

Figure 3:
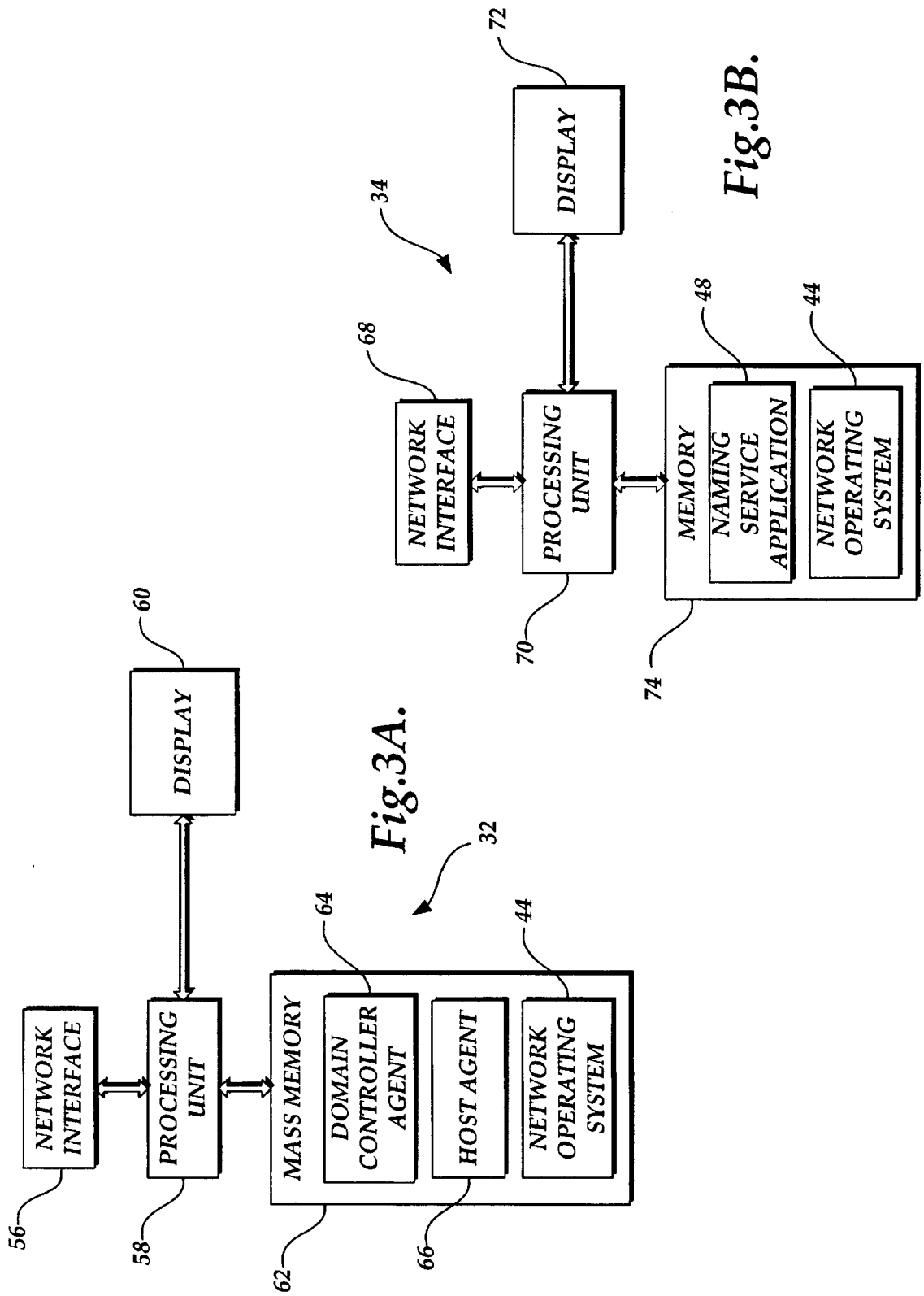
FIG. 3A is a block diagram of the several components of a computer connected to the LAN shown in FIG. 1 equipped with a naming service agent that gathers mapping information regarding the computers connected to the LAN and the users of those computers in accordance with the present invention.
FIG. 3B is a block diagram of the several components of a computer connected to the LAN shown in FIG. 1 equipped with a naming service application that utilizes the mapping information collected, maintained, and served by the naming service manager in accordance with the present invention.

In the illustrative embodiment of the present invention described herein, naming service agents 50 and naming service applications 48 are located on computers dispersed throughout the LAN 24. As noted above, naming service agents 50 gather mapping information regarding the computers connected to the LAN 24. Two such naming service agents 50, i.e., a domain controller agent 64 and a host agent 66, are described herein as located on the domain controller server 32. FIG. 3A depicts several of the key components of the domain controller server 32 used to implement the naming service agents 50. However, it is not necessary that all of these generally conventional components be shown in order to adequately disclose an exemplary embodiment for practicing the present invention. The domain controller server 32 comprises a network interface 56, similar to the network interface 36 of the network server 30, that connects the domain controller server 32 to the LAN 24. In addition, the domain controller server 32 includes a processing unit 58, display 60 and mass memory 62 similar to those found in the network server 30.

Mass memory 62 of the domain controller server 32 stores either the domain controller agent 64 or the host agent 66 that can be used in conjunction with the naming service manager 46 to maintain updated and accurate mapping information for each user and computer of the LAN 24 at any given time. As will be described in more detail below, the domain controller agent 64 gathers dynamic user login and logout information. The host agent 66, on the other hand, gathers current IP address assignments for the computers connected to the LAN 24. Once gathered, the domain controller agent 64 or host agent 66, whichever the case may be, transmits the mapping information to the naming service manager 46 for further processing. Although both the domain controller agent 64 and the host agent 66 are shown in FIG. 3A, it will be appreciated that only one or the other is normally employed by the naming service manager 46. For example, if dynamic user-to-computer mapping and computer-to-IP address mapping are desired, the domain controller agent 64 is employed. However, if user-to-computer assignments are to remain static, but dynamic computer-to-IP address mapping is still desired, the host agent 66 is employed. Although the host agent 77 is described herein as being located on the domain controller server 60, those of ordinary skill in the art will recognize that the host agent may be located on any suitable computer connected to the LAN 44. It will also be appreciated that many other types of agents may be employed by the present invention, and that the domain controller agent 64 and the host agent 66 are merely illustrative examples of such naming service agents 50.

The domain controller agent 64 and the host agent 66 are referred to as "dynamic sources" of mapping information because they gather mapping information, i.e., computer-to-user and computer-to-IP address assignments or mappings, that are dynamically updatable as users log into and out of computers connected to the LAN 24 and as IP addresses for computers connected to the LAN 24 change. In contrast, the present invention also implements naming service agents 50 that are referred to as "static sources" of mapping information because they provide static or permanent computer-to-user and computer-to-IP address assignments that do not change as users log into and out of computers connected to the LAN 24. As will be described below, the only way in which a static computer-to-user or computer-to-IP address assignment can be changed is if a static naming service agent (rather than a dynamic naming service agent) provides the naming service manager 46 with a new assignment. Those of ordinary skill in the art will appreciate that virtually any application program interface that allows a network administrator to assign network users to network computers and/or to assign network computer names to IP addresses is a static source of mapping information and thus, can serve as a naming service agent 50 to the naming service manager 46. An example of such a static source of mapping information is disclosed in commonly assigned U.S. Patent Application entitled METHOD AND APPARATUS FOR MANAGING INTERNETWORK AND INTRANETWORK ACTIVITY, filed Apr. 2, 1997, to Abraham et al. (the "Abraham application"), the disclosure and drawings of which are specifically incorporated herein by reference.

After the naming service manager 46 receives mapping information from its naming service agents 50, the naming service manager 46 further processes the mapping information and passes it on to a plurality of naming service applications 48 located on computers dispersed throughout the LAN 24. Several of the key components of one of the client computers 34 used to implement a naming service application 48 is shown in FIG. 3B. Those of ordinary skill in the art will appreciate that the client computer 34 includes many more components than those shown in FIG. 3B. However, it is not necessary that all of these generally conventional components be shown in order to adequately disclose an exemplary embodiment for practicing the present invention. The client computer 34 is connected to the LAN 24 via a network interface 68 similar to the network interface 36 of the network server 30. Each computer 34 also includes a processing unit 70, a display 72, and a memory 74. The memory 74 comprises a conventional disk, read-only memory, and random access memory for storing a portion of the network operating system 44 and a naming service application 48.

As will be described in more detail below, the naming service manager 46 serves updated mapping information to the naming service application 48 so that the naming service application 48 can process the mapping information in accordance with its own needs and requirements. For example, the naming service application may be an electronic mail (E-mail) application that uses the mapping information to deliver E-mail to its intended user regardless of which computer in the LAN 24 the intended recipient is currently utilizing. Those of ordinary skill in the art will recognize that virtually any application program equipped with the necessary program code may be transformed into a naming service application 48 in accordance with the present invention. An example of such a naming service application is also disclosed in the Abraham application already incorporated herein by reference. Further, those of ordinary skill in the art will appreciate that any number of naming service applications 48 can be dispersed throughout the LAN 24 and that any number of naming service applications can be located on any one computer connected to the LAN 24.

As for the remaining computers connected to the LAN 24, these computers may or may not be installed with a naming service application 48 or agent 50. Therefore a detailed description of the electronic components of these computers is not required to adequately disclose an exemplary embodiment of the present invention. However, it will be appreciated that any mapping information related to these computers is still collected, maintained, and served by the naming service manager 46 in accordance with the present invention.

Collecting, Gathering, and Serving Mapping Information

Figure 4:
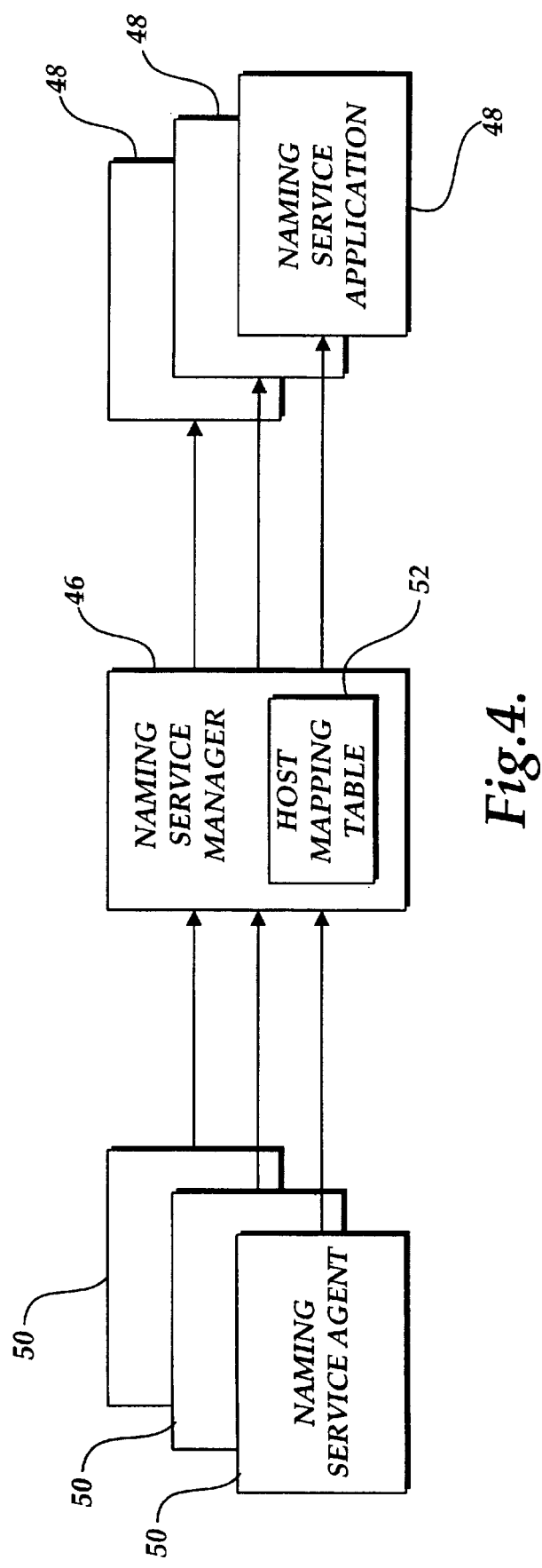
FIG. 4 is a block diagram illustrating the flow of mapping information from a naming service agent, to the naming service manager, and ultimately to a naming service application in accordance with the present invention.

In accordance with the present invention, mapping information is gathered by the naming service agents 50, transmitted to and further processed by the naming service manager 46, and ultimately served to the naming service applications 48 as shown in FIG. 4. Although FIG. 4 depicts a plurality of naming service agents 50 and naming service applications 48, those of ordinary skill in the art will appreciate that the present invention may employ only one agent and/or application or a plurality of agents and/or applications. In other embodiments of the present invention, a naming service application may also serve as a naming service agent and vice versa. A example of such a combined agent/application is disclosed in the Abraham application already incorporated by reference herein.

Figure 5A:
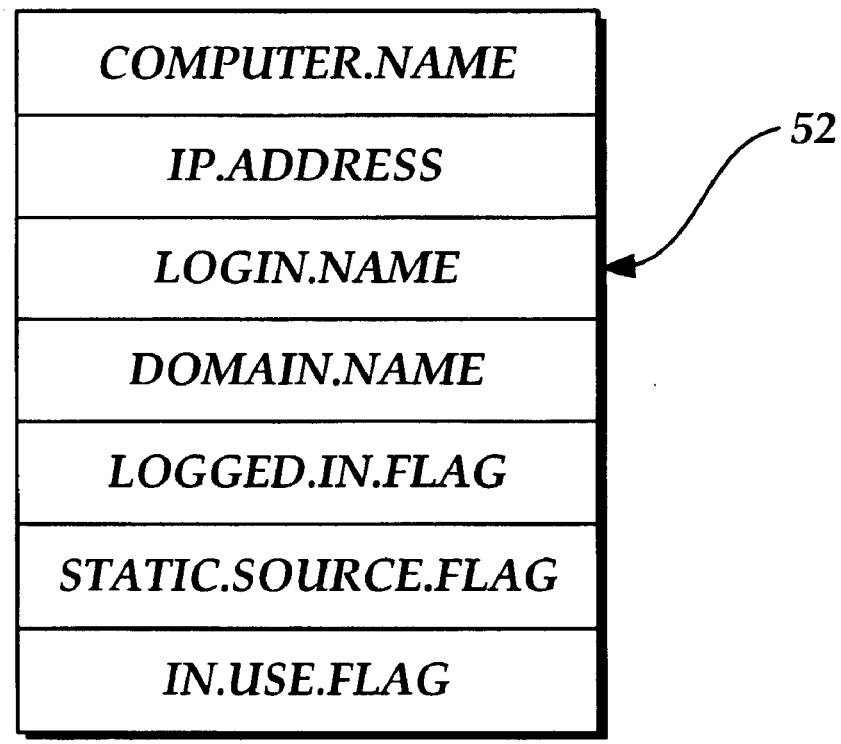
FIG. 5A is a block diagram illustrating a host mapping table used by the naming service manager to maintain naming service information in accordance with the present invention.

The mapping information gathered by the naming service agents 50 and provided to the naming service manager 46 is maintained by the naming service manager 46 in a host mapping table 52. The host mapping table 52 is shown in more detail and in FIG. 5A. The host mapping table 52 consists of a plurality of records containing mapping information for each computer connected to the LAN 24. More specifically, each record includes a field for storing the computer name, the IP address assigned to that computer name, the login name of the user currently utilizing the computer and the domain name for the computer. It will be appreciated that the domain name stored in the record may not necessarily be the fully qualified domain name of the computer. In the actual embodiment of the present invention described herein, the domain name is only the name of the domain to which the LAN 24 belongs. The record also includes a logged in flag, which when set, indicates that the user identified in the record by login name is logged in to the computer identified in the record. In addition, a static source flag is provided, which when set, indicates that the mapping information contained in the record was provided to the naming service manager 46 by a static source for such information, i.e., a naming service agent 50 that provides permanent or static user-to-computer assignments to the naming service manager 46. If not set, the static source flag indicates that the mapping information contained in the record was provided by a dynamic source, i.e., a naming service agent 50 that provides dynamic or changeable naming service information. Finally, each record contains an in-use flag, which when set, indicates that the record is an active record, and thus may be served to naming service applications 48.

Figure 5B:
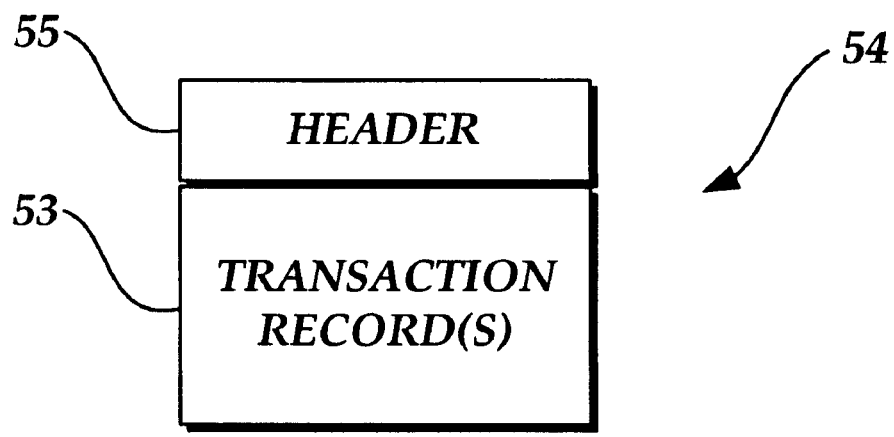
FIG. 5B is a block diagram of a transaction container which stores the mapping information as it is communicated between the naming service agent, the naming service manager, and the naming service application.

The naming service manager 46 receives mapping information from the naming service agents 50 and serves mapping information to naming service applications 48 in the form of a transaction container 54 shown in FIG. 5B. The transaction container 54 includes a header 55 followed by zero or more transaction records 53. The header 55 identifies the type of transaction being performed. For example, if the transaction container 54 contains updated mapping information for the host mapping table 52, the header will identify the transaction container 54 as an update container and the header will be followed by a plurality of transaction records 53 containing the updated mapping information. Each transaction record 53 is further identified as a user login update record, a user logout update record, a current address update record, or a prior address update record depending on the updated mapping information the transaction record contains. The last transaction record 53 in the transaction container 54 is an empty record and indicates the completion of transaction records in the transaction container 54.

In some instances, the transaction container 54 may contain information other than updated mapping information. More specifically, the transaction container 54 may contain a request from a naming service agent 50 or naming service application 48 to register as an agent or application with the naming service manager 46. In such cases, the header 55 of the transaction container 54 identifies the transaction container as a naming service agent or application registration container, whichever the case may be. However, the transaction container 54 does not contain any transaction records 53. As will be described in more detail below, when the naming service manager 46 receives a registration container from a naming service agent 50 or application 48, the naming service manager 46 opens communication with the agent or application and begins accepting transaction containers 54 from the agents 50 and communicating transaction containers 54 to the applications 48.

Similarly transaction containers 54 may contain requests from naming service agents 50 or applications 48 to unregister and close communications with the naming service manager 46. In such cases, the header 55 of the container 54 identifies the transaction container as an unregistration container, but the transaction container does not contain any transaction records 53.

Finally, a naming service agent 50 or naming service application 48 may query the naming service manager 46 for mapping information regarding a particular network user or network computer. Consequently, the agent or application will send the naming service manager 46 a transaction container 54 identified in the header 55 as a query container. In addition, the header 55 contains the login name of the user for whom the agent or application is seeking mapping information or the IP address or computer name of a computer for which the agent or application is seeking mapping information. As will be described in more detail below, the naming service manager 46 will return the corresponding mapping information found in the host mapping table 52. the query container does not contain any transaction records.

Figure 6A:
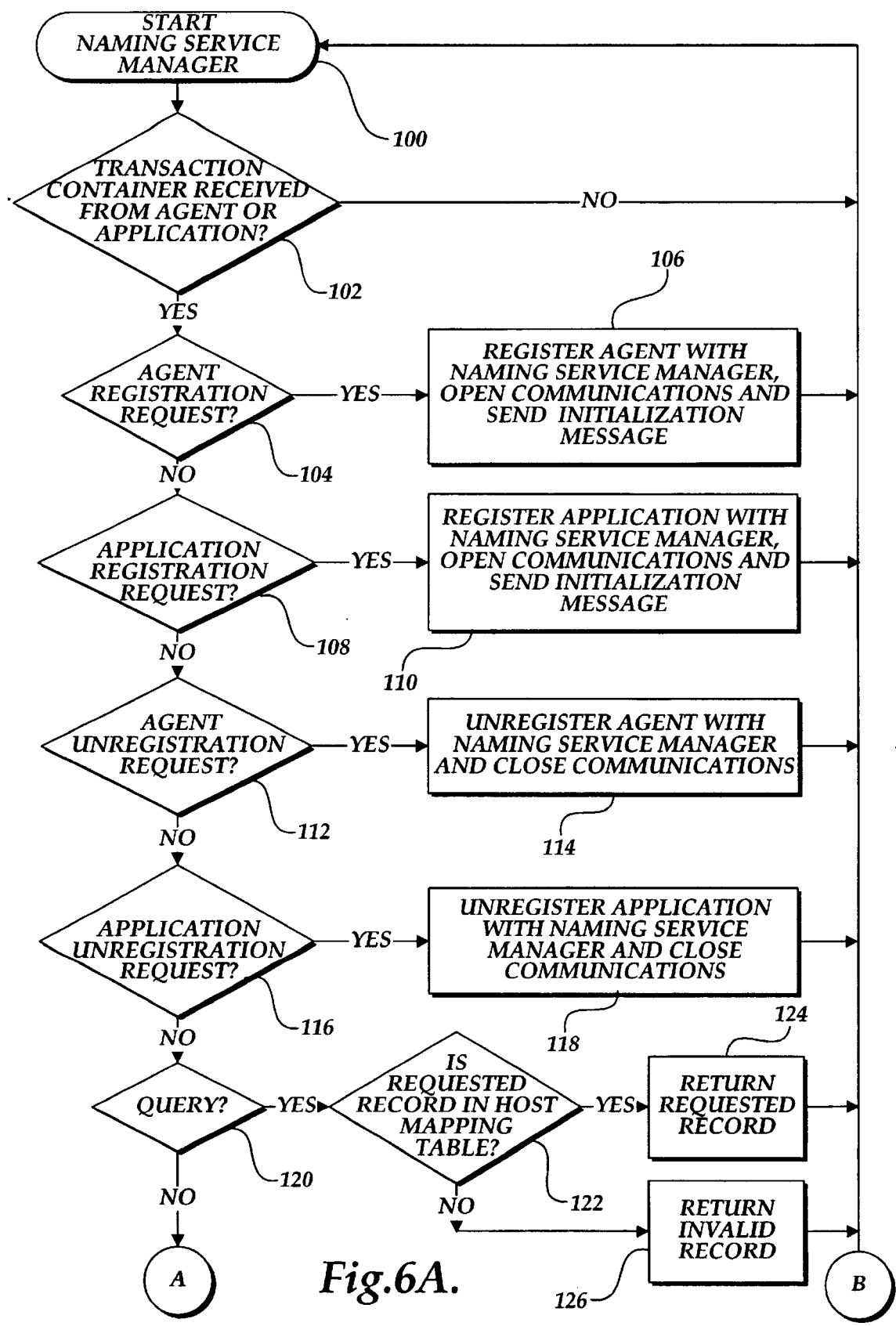
FIGS. 6A and 6B are a flow chart illustrating the logic used by the naming service manager to collect, maintain and serve mapping information in accordance with the present invention.
Figure 6B:
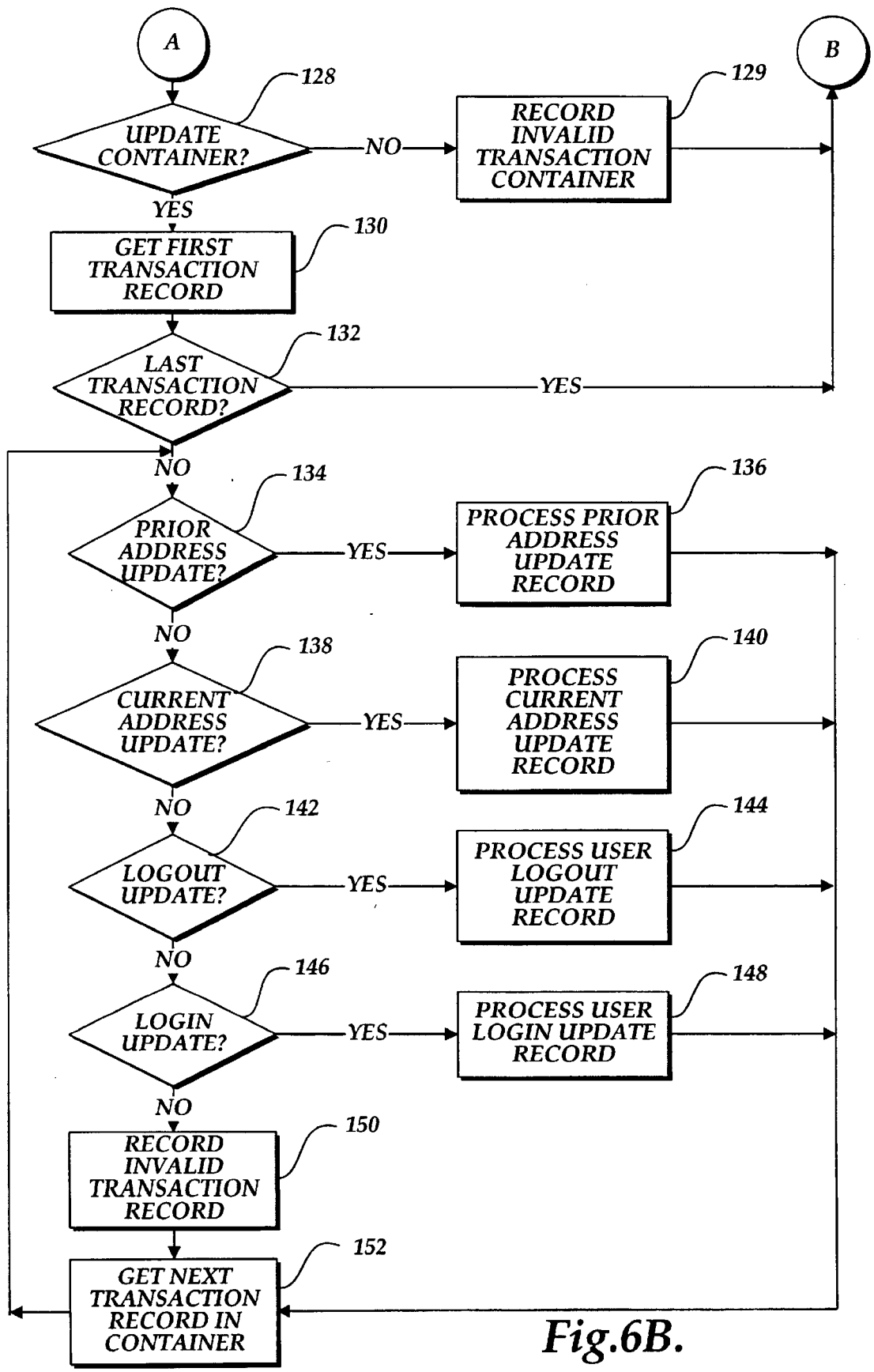

The logic implemented by the naming service manager 46 to process transaction containers 54 received from naming service agents 50 and to send transaction containers 54 containing mapping information to naming service applications 48 is shown in FIGS. 6A and 6B. The logic begins in FIG. 6A in a block 100 and proceeds to a block 102 where the logic determines if a transaction container 54 has been received from one of the naming service agents 50 or naming service applications 48. If the result of decision block 102 is negative, block 102 is merely repeated until a transaction container 54 is received by the naming service manager 46. Once a transaction container 54 is received, the logic proceeds to a decision block 104 where it determines if the transaction container 54 contains a registration request from a naming service agent 50. If so, the logic proceeds to a block 106 where the naming service manager 46 opens communications with the requesting naming service agent 50, sends the naming service agent in initialization message in the form of a transaction container 54 and registers the naming service agent as a source of mapping information. If the naming service agent 50 is a source of static or permanent mapping information, it will be appreciated that the naming service agent is registered as a static source of information. Conversely, if the naming service agent 50 is a source of dynamic mapping information, e.g., domain controller agent 64, the naming service agent is registered with the naming service manager as a dynamic source of mapping information.

Figure 7:
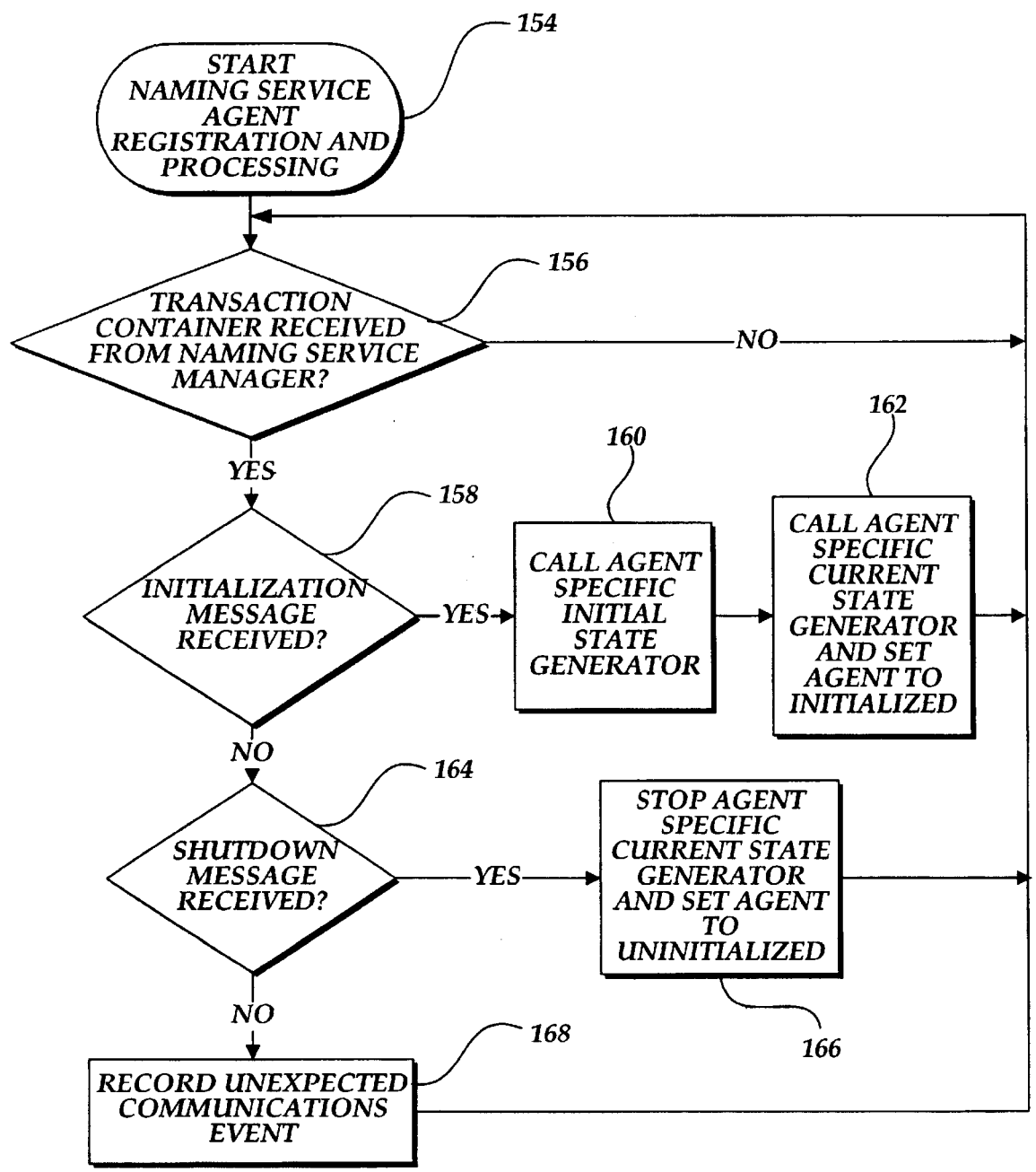
FIG. 7 is a flow chart illustrating the logic used by a naming service agent to gather mapping information regarding the computers connected to the LAN shown in FIG. 1.

FIG. 7 depicts the logic implemented by a naming service agent 50 once it sends a registration request to the naming service manager 46. The logic begins in FIG. 7 in a block 154 and proceeds to a decision block 156 where the naming service agent 50 determines if a transaction container 54 has been received from the naming service manager 46. If no such transaction container has been received, decision block 156 is merely repeated by the naming service agent 50 until a transaction container 54 is received from the naming service manager 46. When this occurs, the logic proceeds to a decision block 158 where the naming service agent 50 determines if the transaction container 54 contains an initialization message from the naming service manager 46. If so, the naming service agent 50 implements an initial state generator to begin gathering mapping information regarding the computers connected to the LAN 24 in a block 160.

Once the specific agent initial state generator has been called, a current state generator for the naming service agent 50 is called and the naming service agent 50 is set to an initialized state in a block 162. The logic then returns to decision block 156 where the naming service agent 50 waits for another transaction container 54 from the naming service manager 46.

The initial state generator and the current state generator called in blocks 276 and 278, respectively, depend on the specific naming service agent 50. In the illustrative embodiment of the present invention described herein, a domain controller agent 64 or a host agent 66 are implemented. However, those of ordinary skill in the art will recognize that many other types of agents may be employed by the present invention, and that the domain controller agent 64 and host controller agent 66 are merely illustrative examples of such naming service agents 50. The initial and current state generators for the domain controller agent 64 and the host agent 66 are described in more detail below.

Figure 8:
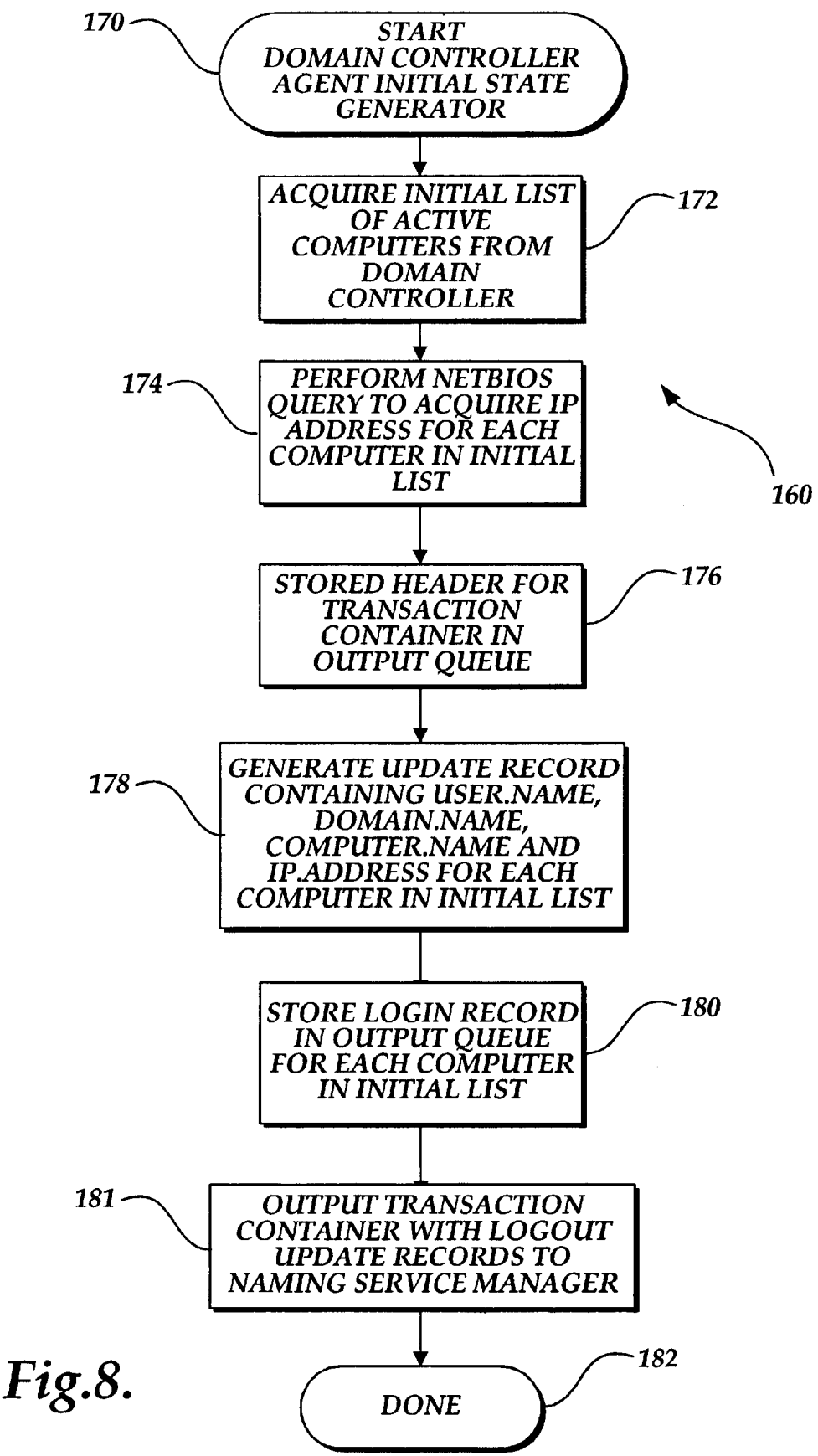
FIG. 8 is a flow chart illustrating the logic used by a first specific naming service agent upon initialization to process mapping information indicating that a user has logged into or out of a computer connected to the LAN shown in FIG. 1.

FIG. 8 illustrates the logic used by the initial state generator for the domain controller agent 64. The logic begins in a block 170 and proceeds to a block 172 where the domain controller agent acquires an initial list of computers in active session with the LAN 24 and into which users have logged, from the domain controller server 32. In a block 174, the domain controller agent 64 performs a NETBIOS query to acquire the IP address for each computer in the initial list. Those of ordinary skill in the art will recognize that NETBIOS is an application program interface used to provide other application programs with computer-to-IP address assignments and with a uniform set of commands for requesting lower level network services required to conduct sessions between computers connected to the LAN 24, so that the computers may transmit data back and forth via the LAN 24.

Once the IP address for each computer identified in the initial list is acquired from the NETBIOS application program interface, the domain controller agent 64 begins preparing a transaction container 54 to be transmitted to the naming service manager 46. In this regard, the domain controller agent 64 stores a header 55 for the transaction container 54 in an output queue that identifies the transaction container 54 as an update transaction container in block 176. In a block 178, the domain controller agent 64 generates a transaction record 53 for each computer in the initial list. Each transaction record is identified as a login update record and includes the domain name, computer name and IP address for the computer, as well as the login name of the user currently utilizing the computer. Each of the login transaction records are then stored in an output queue along with the transaction container header 55 in a block 180. In a block 181, the output queue outputs the transaction container 54 to the naming service manager 46. The logic then ends in a block 182. As will be described in more detail below, upon receipt of the transaction container 54, the naming service manager 46 will update the host mapping table 52 with the mapping information stored in the login update records, and provide updated mapping information from the host mapping table 52 to the naming service applications 48 that have registered with the naming service manager 46 for such information.

Figure 9:
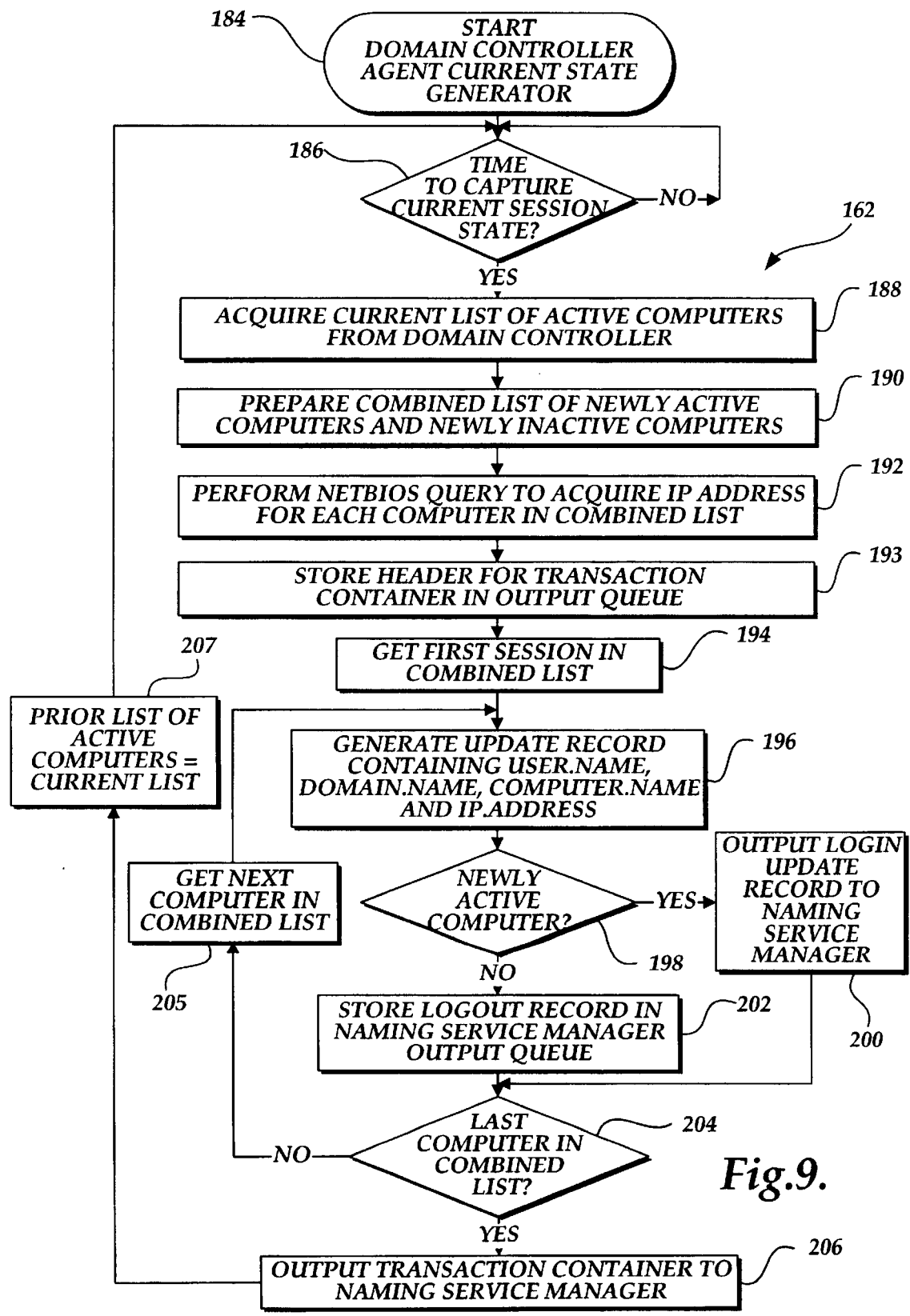
FIG. 9 is a flow chart illustrating the logic used by the first specific agent after initialization to process mapping information indicating that a user has logged into or out of a computer connected to the LAN shown in FIG. 1.

The logic implemented by the current state generator for the domain controller agent 64 is shown in FIG. 9. The logic begins in a block 184 and proceeds to a decision block 186 where the domain controller agent 64 determines if it is time to capture the current session state of the computers connected to the LAN 24. Those of ordinary skill in the art will recognize that the domain controller agent 64 will periodically capture the current session state of the LAN 24 and that the time period for doing so is variable. If the result of decision block 186 is negative, decision block 186 is merely repeated until such time has arrived. When the time has arrived, the logic proceeds to a block 188 where the domain controller agent 64 acquires a current list of computers in active session with the LAN 24 and into which users have logged, from the domain controller server 32. In a block 190, the domain controller agent 64 prepares a combined list identifying both newly active and newly inactive computers by comparing the current list of active computers to a prior list of active computers. Those of ordinary skill in the art will appreciate that during the first iteration of the current state generator, the prior list of active and logged into computers is actually the initial list of such computers obtained by the initial state generator for the domain controller agent 64. In subsequent iterations of the current state generator, the prior list of active and logged into computers is actually the list of active computers obtained by the domain controller agent 64 in the prior iteration of the current state generator. By comparing the current list of active and logged into computers to the prior list of active and logged into computers, the domain controller agent 64 identities which logged into computers have established an active session with the LAN 24, i.e., which computers have been logged into by a user, and which computers have been logged out of by a user, since the last session state was captured. More specifically, if a computer is present in the current list of active and logged into computers, but is not present in the prior list of active and logged into computers, the computer is identified in the combined list as newly active. Similarly, if a computer is present in the prior list of active and logged into computers, but is not present in the current list, the computer has ended its session with the LAN 24 since the last session was captured, and is thus is identified as a newly inactive computer in the combined list.

After the combined list is prepared in block 190, the domain controller agent 64 performs a NETBIOS query to acquire the IP address for each computer identified in the combined list in a block 192. In a block 193, the domain controller agent 64 begins preparation of the transaction container 54 to be sent to the naming service manager 46 by storing a header 55 identifying the transaction container as an update container in the domain controller agent's output queue. The domain controller agent 64 then processes the combined list in order to add transaction records 53 to the transaction container 54.

In this regard, the domain controller agent 64 obtains the first computer identified in the combined list in a block 194. In a block 196, the domain controller agent 64 generates a transaction record 53 containing the domain name, computer name, and IP address of the computer as well as the login name of the user assigned to the computer. In a decision block 198, the domain controller agent 64 determines if computer is a newly active computer. If so, the domain controller agent 64 identifies the transaction record 53 as a login update record and stores the login update record in output queue in a block 200. Otherwise, the domain controller agent 64 identifies the transaction record 53 as a logout update record and then stores the logout update record in output queue in a block 202. Ultimately, the logic proceeds to a decision block 204 where the domain controller agent 64 determines if the last computer in the combined list has been processed. If not, the next computer in the combined list is obtained in a block 205 and blocks 196–206 are repeated for each computer in the combined list so that either a login transaction record or a logout transaction record is stored in the transaction container 54, and hence in the output queue of the domain controller agent 64.

When the last computer in the combined list has been processed, the output queue outputs the transaction container 54 to the naming service manager 46 in a block 206. Next, the current list of active computers acquired in block 188 is stored as the prior list of active computers in a block 207 and the logic returns to decision block 186 where the domain controller agent 64 waits to capture the next current session state. Blocks 186–207 are then repeated by the domain controller agent 66 for each current session state captured. Consequently, the domain controller agent 66 will continue generating and sending transaction containers 54 containing login and logout update records to the naming service manager 46 for further processing as each new session state is captured.

Figure 10:
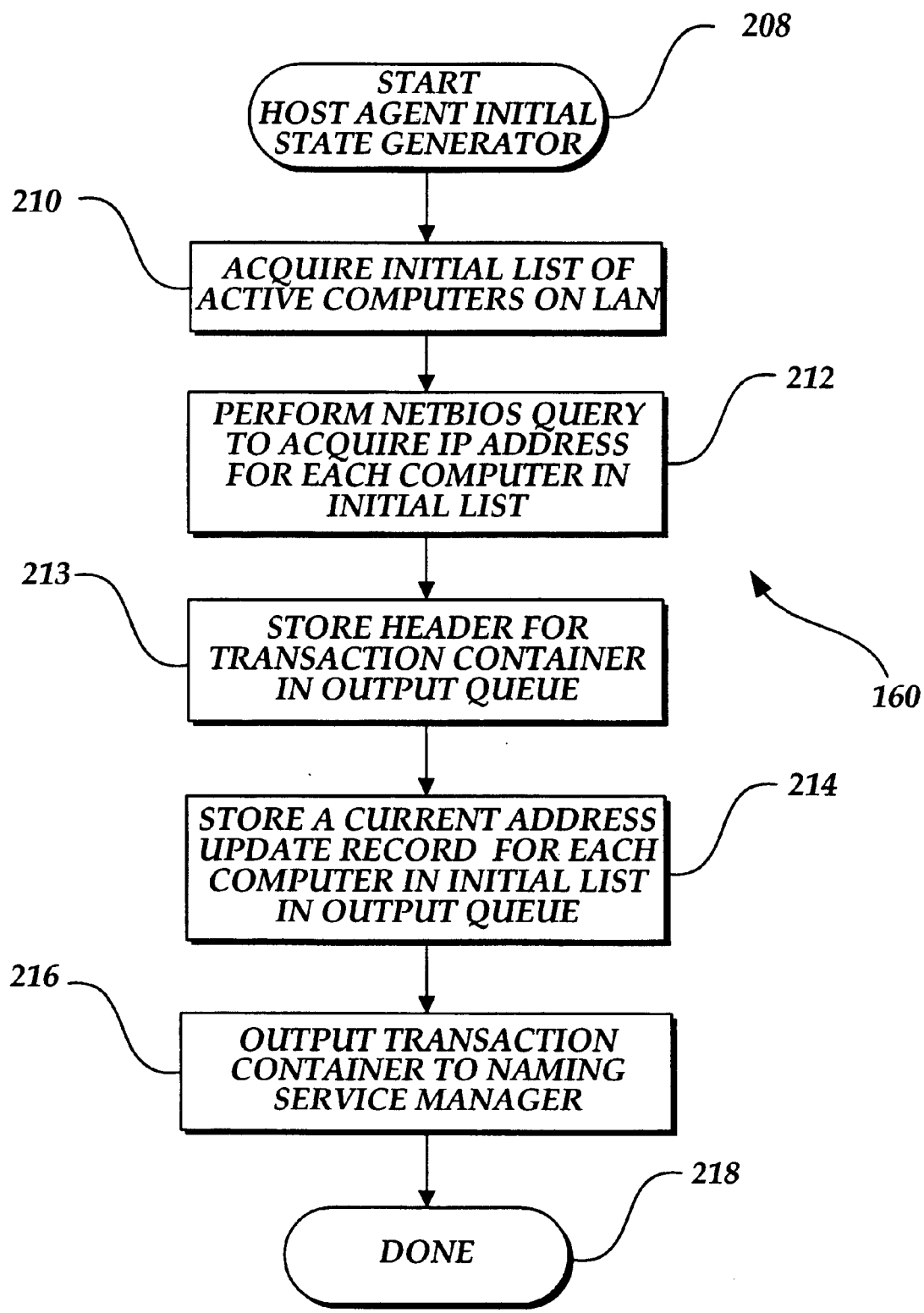
FIG. 10 is a flow chart illustrating the logic used by a second specific naming service agent upon initialization to process mapping information indicating that an IP address for a computer connected to the LAN shown in FIG. 1 has changed.

As noted above, a host agent 66 is employed in some embodiments of the present invention, rather than the domain controller agent 64. Specifically, the host agent is employed when changes to the computer-to-user mappings are inhibited (unless provided by a static source), but changes in IP address-to-computer mappings are allowed. In this regard, the host agent 66 gathers IP address updates. The logic implemented by the initial state generator for the host agent 66 is shown in more detail in FIG. 10. The logic begins in a block 208 and proceeds to a block 210 where the host agent 66 acquires an initial list of computers in active session with the LAN 24 (but not necessarily logged into by a user) from the domain controller server 32. It will be appreciated by those of ordinary skill in the art that the initial list acquired by the initial state generator for the host agent 66 will be very similar to the initial list acquired by the initial state generator for the domain controller agent 64, since both agents are acquiring information from the domain controller server 32. Hence, it follows that if the host agent 66 was located on the network server 30 or another server connected to the LAN 24, the initial list acquired by the host agent might be somewhat different.

Once an initial list is acquired by the host agent 66, the host agent 66 performs a NETBIOS query in a block 212 to acquire the IP address for each computer identified in the initial list. In a block 213, the host agent 66 stores a header for the transaction container 54 to be sent by the host agent 66 to the naming service manager 46 in an output queue of the host agent 66. Next, in a block 214, the host agent 66 generates a transaction record 53 for each computer identified in the initial list and stores each such record in the output queue following the header of the transaction container 54. Each transaction record 53 generated and stored by the host agent 66 is identified as a current address update record since each IP address returned by the NETBIOS query is treated as a new address for its associated computer. In a block 216, the output queue of the host agent 66 outputs the transaction container 54 including the header generated in block 325, the current address transaction records, and a last transaction record 53 signaling the end of the container, to the naming service manager 46. The logic then ends in a block 218.

Figure 11A:
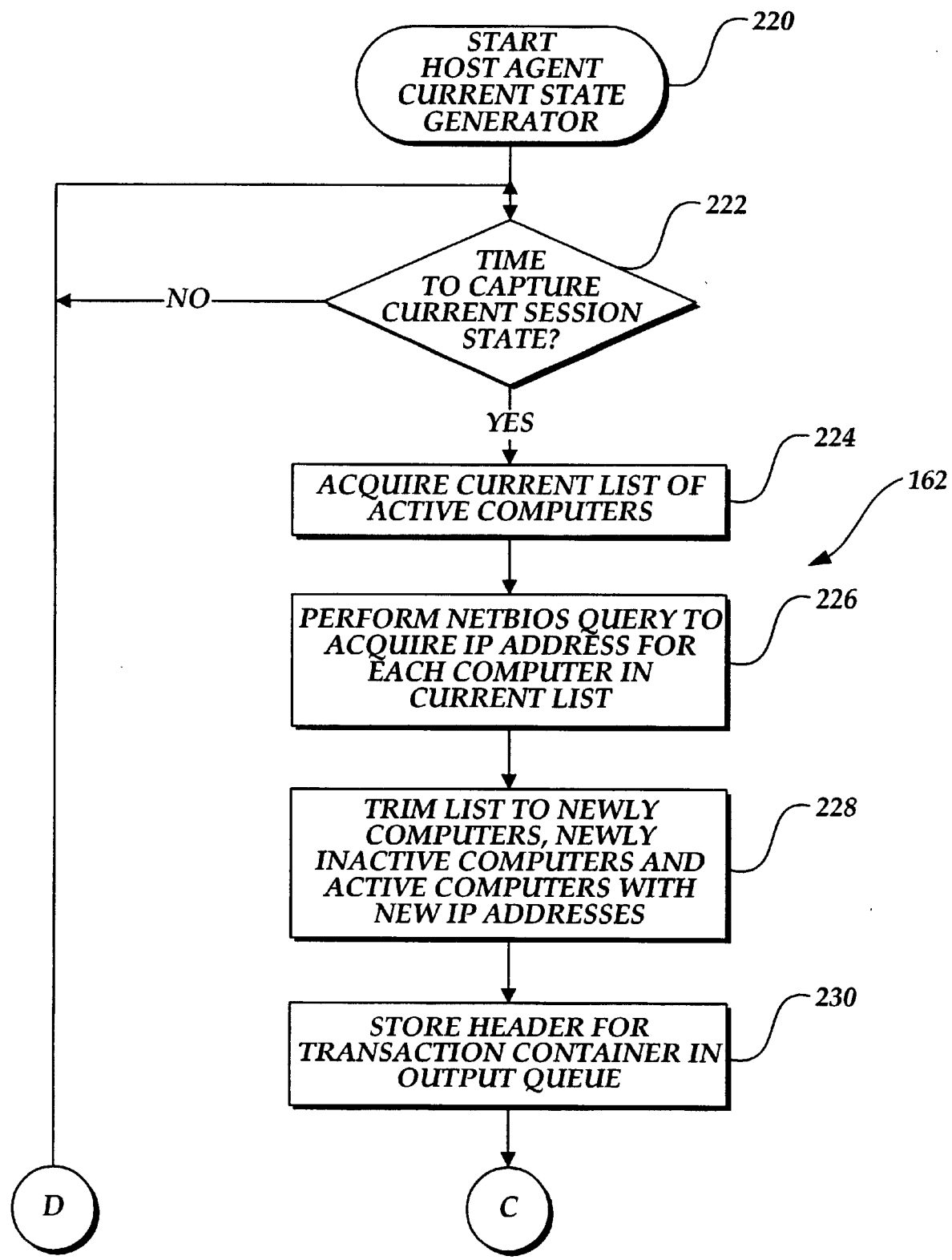
FIGS. 11A and 11B are a flow chart illustrating the logic used by the second specific agent after initialization to process mapping information indicating that an IP address for a computer connected to the LAN has changed.
Figure 11B:
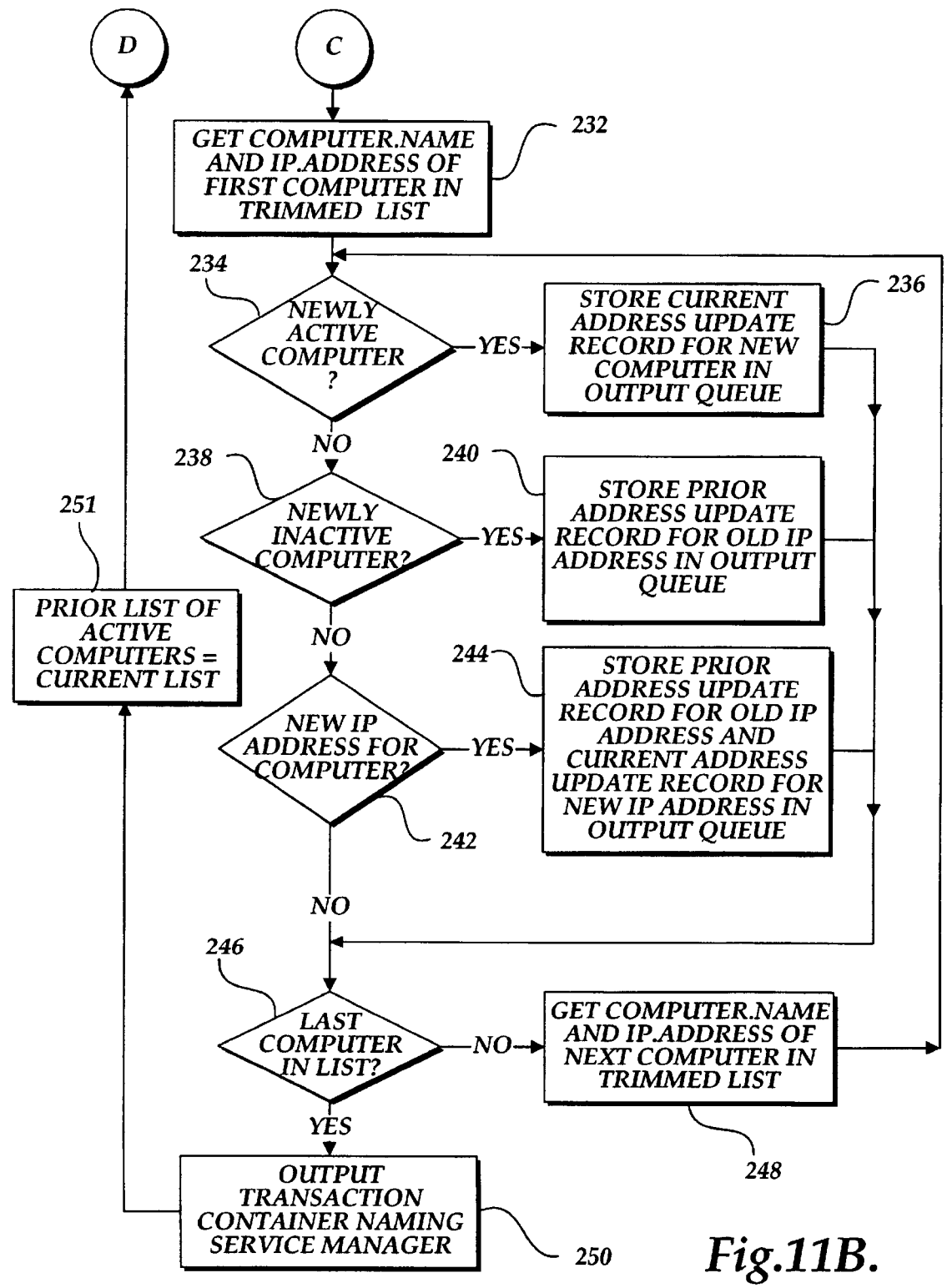

As noted above, after the initial state generator for the host agent 66 is called, the current state generator for the host agent 66 is called. The logic implemented by the current state generator for the host agent 66 is shown in more detail in FIGS. 11A and 11B. The logic begins in FIG. 11A in a block 220 and proceeds to a decision block 222 where it determines if it is time to capture the current session state of the computers connected to the LAN 24. If not, decision block 222 is repeated until such time arrives. When the time arrives to capture the current session state, the logic proceeds from decision block 222 to a block 224 where the host agent 66 acquires a current list of active computers connected to the LAN 24. In a block 226, the host agent 66 performs a NETBIOS query to acquire the IP address for each computer identified in the current list. In a block 228, the host agent 66 prepares a trimmed list identifying newly active computers, newly inactive computers, and active computers with new IP addresses. The trimmed list is prepared by comparing the current list of active computers obtained in block 224 with a prior list of active computers. Those of ordinary skill in the art will appreciate that during the first iteration of the current state generator, the prior list of active computers is actually the initial list obtained by the initial state generator for the host agent 66, and that in subsequent iterations of the current state generator, the prior list of active computers is actually the list of active computers obtained by the host agent 66 in the prior iteration of the current state generator. Newly active computers appear only in the current list, while newly inactivated computers appear only in the prior list. Computers with new IP addresses appear in both lists, but the IP addresses associated with those computer names are different.

Once the trimmed list is prepared by the current state generator of the host agent 66 in block 228, the host agent 66 stores a header 55 for the transaction container 54, identifying the transaction container as an update transaction container in the host agent's output queue in a block 230. Next, in a block 232 shown in FIG. 11 B, the host agent 66 obtains the next computer in the trimmed list. In a decision block 234, the host agent 66 determines if the computer is a newly active computer. If so, the host agent 66 generates and stores a transaction record 53 containing the mapping information for the newly activated computer in the output queue following the header 55 of the transaction container 54 in a block 236. The transaction record 53 is identified as a current address update and includes the computer name and IP address of the newly activated computer.

Returning to decision block 234, if the computer identified in the trimmed list is not a newly active computer, the logic proceeds to a decision block 238 where the host agent 66 determines if the computer is newly inactive computer, i.e., if the computer has ended its active session with the LAN 24 since the last capture of the current session state. If so, the host agent 66 generates and stores a transaction record 53 in the output queue containing the mapping information of the newly inactive computer. The transaction record 53 is identified as a prior address update and includes the old IP address and the computer name of the newly inactive computer.

Returning to decisions block 238, if the computer being processed is not newly active or newly inactive, the logic proceeds to a decision block 242 where the host agent 66 determines if a new IP address for the computer has been assigned. If so, the host agent 66 generates and stores two different transaction records 53 in the output queue in a block 244. The first transaction record 53 is identified as a prior address update and contains the former IP address for the computer and its computer name. The second transaction record 53 is identified as a current address update and contains the new IP address of the computer and its computer name.

Returning to decision block 242, if the computer does not have a new IP address, or if transaction record 53 for the computer has already been generated and stored in the output queue as described above, the logic proceeds to a decision block 246 and the host agent 66 determines if the last computer in the trimmed list has been processed. If not, the next computer in the trimmed list is obtained in a block 249 and the logic returns to decision block 234 so that the next computer can be processed. However, if the last computer in the trimmed list has been processed, the logic will proceed from decision block 246 to a block 250 where the output queue of the host agent 66 outputs the transaction container 54 containing the header and transaction records stored in the output queue along with an empty transaction record indicating the end of the transaction container 54 to the naming service manager 46. In a block 251, the current session list is stored as the prior session list. The logic then returns to decision block 222 in FIG. 11 A so that the host agent 66 can determine if it is time once again to capture the current session state. Blocks 222–251 are then repeated by the host agent 66 for each current session state captured. Consequently, the host agent 66 will continue generating and sending transaction containers 54 containing current and prior address update records to the naming service manager 46 for further processing as each new session state is captured.

Returning to FIG. 7, once the specific initial and current state generators for the naming service agent 50 have been called in blocks 160 and 162, the logic returns to a decision block 156 where the naming service agent 50 waits for another transaction container 54 from the naming service manager 46. If a transaction container 54 is received that does not include an initialization message from the naming service manager 46, the logic proceeds from a decision block 158 to a decision block 1.64 where the logic determines if the transaction container 54 received by the naming service agent 50 contains a shutdown message. If so, the naming service agent 50 stops its current state generator and sets itself to an uninitialized state in a block 166. The logic then returns to decision block 156 and the naming service waits for another transaction container 54. However, if a transaction container 54 is received by the naming service agent 50 does not contain either an initialization message or a shutdown message, the logic will proceed through decision blocks 158 and 164, to a block 168 where an unexpected communications event is recorded by the naming service agent 50. After recording the unexpected communications event, the naming service agent waits for another transaction container 54 in decision block 156.

Returning to block 106 in FIG. 6A, once the naming service manager 46 completes its registration of the naming service agent 50 so that the naming service agent 50 can begin gathering mapping information and communicating mapping information to the naming service manager 46, the logic returns to decision block 102 where the naming service manager waits for another transaction container 54 from any one of its naming service agents 50 or naming service applications 48. Returning to decision block 104, if a transaction container 54 is received but does not contain a naming service agent registration request, the logic determines in a decision block 108 if the transaction container 54 contains a naming service application registration request. If so, the logic proceeds to a block 110 where the naming service manager 46 opens communications with the requesting naming service application 48, sends a transaction container 54 containing an initialization message to the naming service application 48, and registers the requesting naming service application 48.

Figure 12:
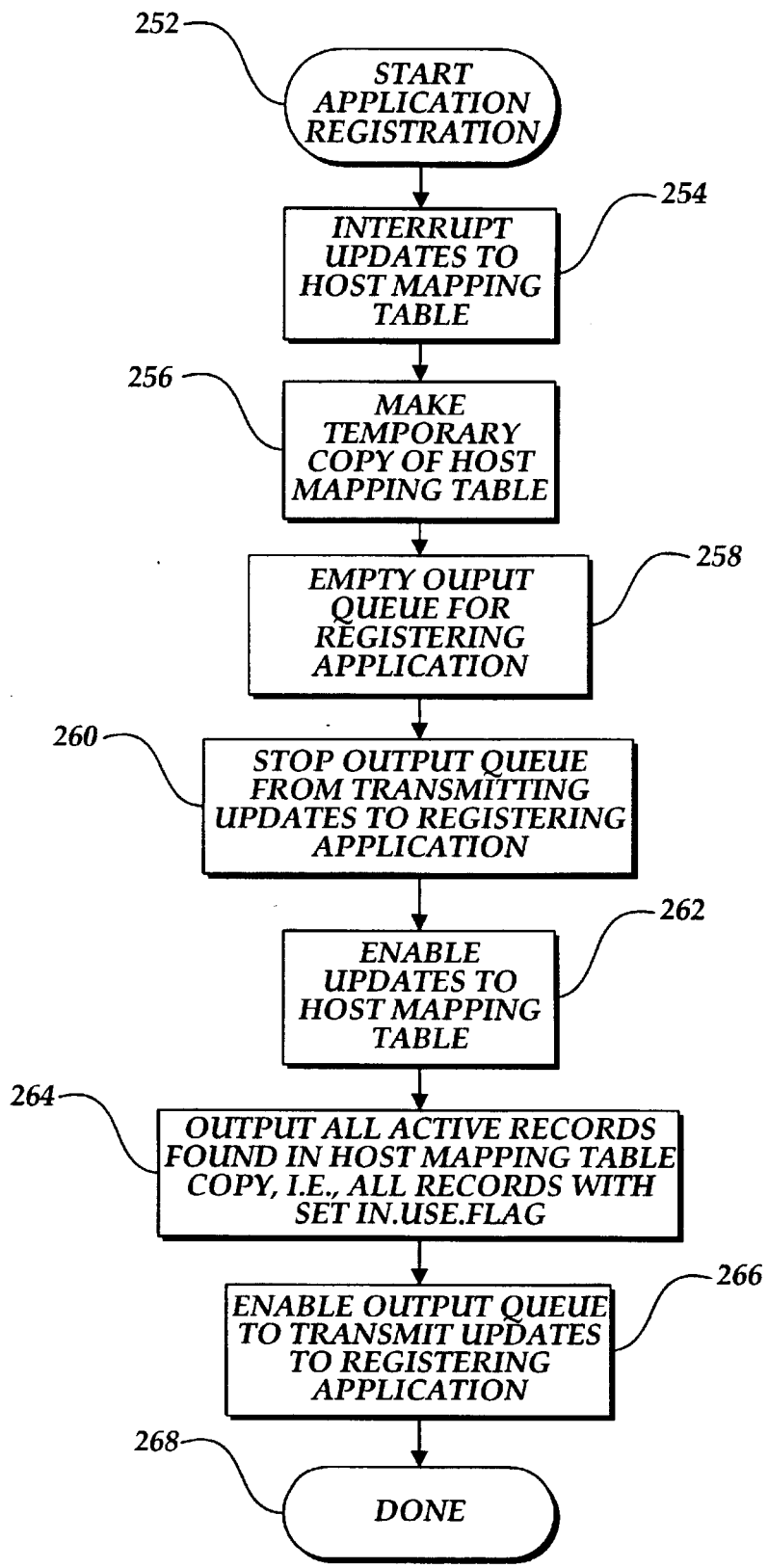
FIG. 12 is a flow chart illustrating the logic used by a naming service application to register with the naming service manager.

The logic implemented by the naming service manager 46 to register the requesting naming service application is shown in more detail in FIG. 12. It will be appreciated by those of ordinary skill in the art that the naming service manager 46 may have begun collecting and maintaining mapping information before it received a registration request from a naming service application 48. Consequently, upon registration, it is necessary that the naming service manager 46 send any mapping information it has already collected and stored in the host mapping table 52 to the registering naming service application 48. In this regard, the logic begins in FIG. 12 in a block 252 and proceeds to a block 254 where the naming service manager 46 interrupts any updates to the host mapping table 52. In a block 256, the naming service manager 46 makes a temporary copy of the host mapping table 52. In blocks 258 and 260, respectively, the naming service manager 46 empties its output queue of any transaction records 53 and stops the output queue from transmitting any transaction containers 54 to the registering naming service application 48. Next, in a block 262, the naming service manager 46 re-enables updates to the host mapping table 52. In a block 264 the naming service manager 46 outputs a transaction container 54 containing all active records found in the temporary copy of the host mapping table to the registering naming service application 48. More specifically, the naming service manager 46 outputs a transaction container 54 including a header 55 and all records in the temporary copy of the host mapping table having an in-use flag that is set. Finally, in a block 266, the naming service manager 46 once again enables the output queue to output transaction containers 54 to the registering application. The logic then ends in a block 268.

Figure 13:
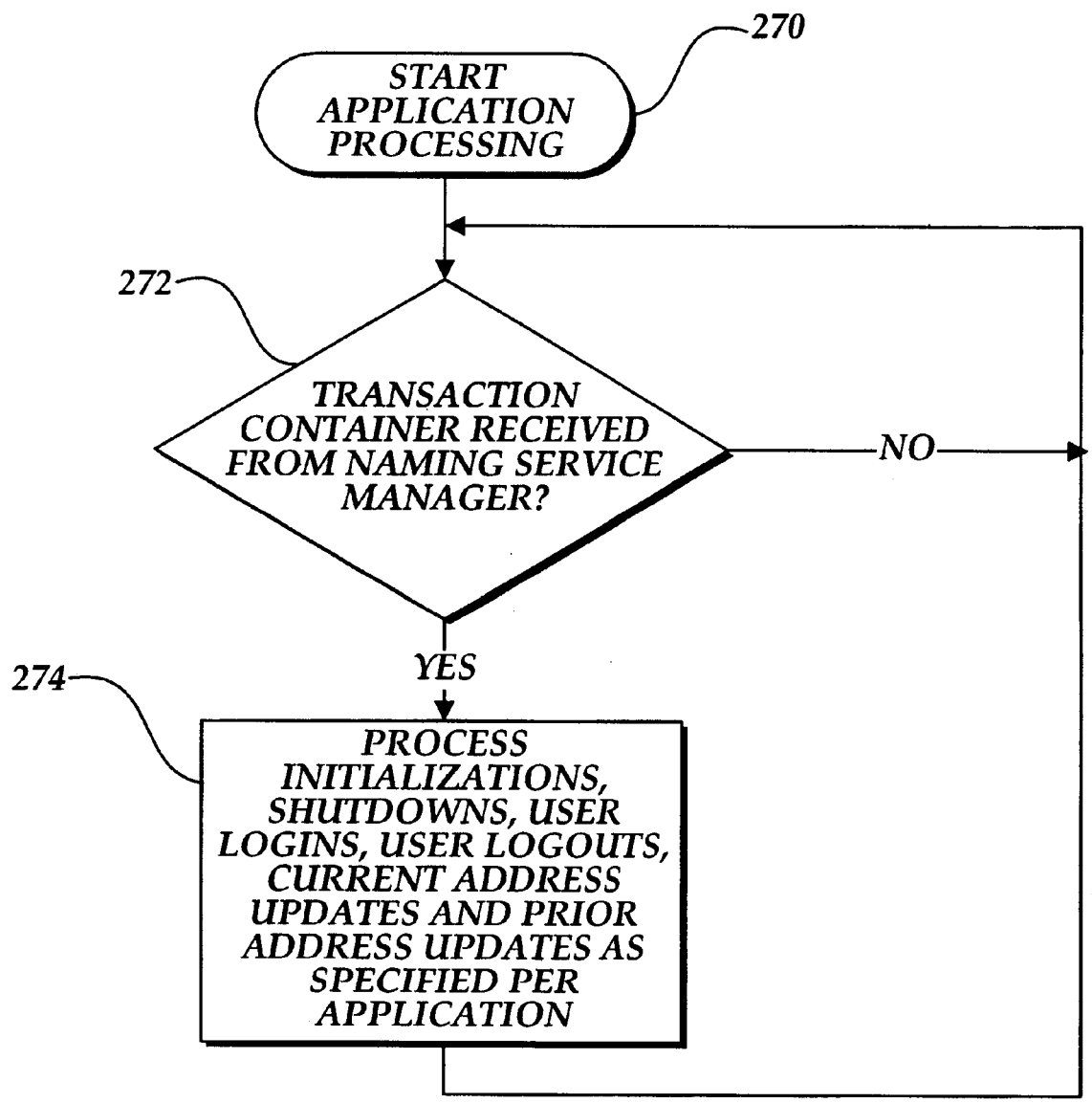
FIG. 13 is a flow chart illustrating the logic used by the naming service application to process mapping information served by the naming service manager.

Returning to block 110 in FIG. 6A, once the naming service manager 46 has registered the requesting naming service application 48 as described above and opened communications with the requesting naming service application, the naming service manager 46 can begin transmitting transaction containers 54 to the naming service application 48 on a regular basis. The logic implemented by naming service applications to process transaction containers is shown in more detail in FIG. 13. The logic begins in FIG. 13 in a block 270 and proceeds to a decision block 272 where it determines if the naming service application 48 has received a transaction container 54 from the naming service manager 46. If not, decision block 272 is merely repeated until a transaction container 54 is received. Once received, the naming service application 48 processes any initialization messages, shutdown messages, and transaction records contained in the transaction container 54 as specified by the needs and requirements of the particular naming service application. For example, if the naming service application comprises an E-mail application, the naming service application would process login update records, logout update records, current address update records, and prior address update records as necessary to ensure that the E-mail delivered by the E-mail application reaches its intended recipient at the correct computer connected to the LAN 24. Another example of such a naming service application 48 is disclosed in the Abraham application already incorporated by reference herein. Once the transaction container 54 is processed by the naming service application 50, the logic returns to decision block 272 and the naming service application 48 waits for another transaction container 54 from the naming service manager 46.

Returning to block 110 in FIG. 6A, once the naming service manager 46 registers the requested naming service application 48 and opens communications with the naming service application 48 so that the naming service application can receive and process transaction containers 54, the logic returns to decision block 102 and the naming service manager 46 waits for another transaction container 54.

Returning to decision block 108, if the received transaction container 54 does not contain either an agent registration request or an application registration request, the logic proceeds to a decision block 112 where it determines if the transaction container 54 contains a naming service agent 50 unregistration request. If so, the naming service agent 50 making the request no longer wishes to gather and communicate napping information for the naming service manager 46. Accordingly, the naming service manager 46 unregisters and closes communications with the naming service agent 50 in a block 114. The logic then returns to decision block 102 and the naming service manager 46 waits for another transaction container 54.

Returning to decision block 112, if the received transaction container 54 does not contain either an agent registration request, an application registration request, or an agent unregistration request, the logic proceeds to a decision block 116 where it determines if the transaction container 54 contains a naming service application 48 unregistration request. If so, the naming service application 48 making the request no longer wishes to receive mapping information from the naming service manager 46. Accordingly, the naming service manager 46 unregisters and closes communications with the naming service application 48 in a block 114. The logic then returns to decision block 102 and the naming service manager 46 waits for another transaction container 54.

Returning to decision block 116, if the received transaction container 54 does not contain an agent registration request, an application registration request, an agent unregistration request, or an application unregistration request, the logic proceeds to a decision block 120 where it determines if the transaction container 54 contains a query from a naming service agent 50 or a naming service application 48 for mapping information. If so, the logic proceeds to a decision block 122 where it determines if the host mapping table 52 maintained by the naming service manager 46 contains a record having the mapping information requested. For example, if the naming service application 48 or agent 50 is seeking mapping information for a particular user, i.e., the computer name, domain name and IP address assigned to a particular user, the naming service manager 46 determines in a decision block 122 if the host mapping table 52 includes a record having the same login name as the login name provided by the querying application or agent in the header 55 of the transaction container 54. If so, the naming service manager 46 returns the record to the requesting agent 50 or application 48 in a block 124. Similarly, if the naming service application 48 or agent 50 is seeking mapping information for a particular computer, the naming service manager 46 determines in decision block 122 if the host mapping table 52 includes a record having the same computer address or IP address provided by the querying application or agent in the header 55 of the transaction container 54. If so, the naming service manager 46 returns the record to the requesting agent 50 or application 48 in block 124. However, if no such record is found in the host mapping table 52 in either case, the naming service manager 46 returns an invalid record to the requesting agent or application in a block 126. The logic then returns to decision block 102 and the naming service manager 46 waits for another transaction container 54

Returning to decision block 120, if the received transaction container 54 does not contain a query, registration request or unregistration request, the naming service manager 46 determines if the transaction container 54 is an update container. If not, the naming service manager records that an invalid transaction container 54 has been received in a block 131 since the received container does not contain any registration or unregistration requests, queries or updates. The logic then returns to decision block 102 in FIG. 6A, and the naming service manager 46 waits for another transaction container 54.

On the other hand, if the transaction container 54 received by the naming service manager 46 is an update container, the first transaction record 53 in the container is obtained by the naming service manager 46 in a block 130. In a decision block 132, the naming service manager 46 determines if the record is the last record in the transaction container 54. If so, processing of the transaction container 54 is complete, and the logic returns to decision block 102 in FIG. 6A. Otherwise, the logic proceeds to a decision block 134 and the naming service manager determines if the transaction record is a prior address update record. If so, the logic proceeds to a block 136 where the naming service manager 46 processes the prior address update record. The prior address update record contains an old IP address and a computer name, but the domain name and login name in the prior address update record are not necessarily valid.

Figure 14:
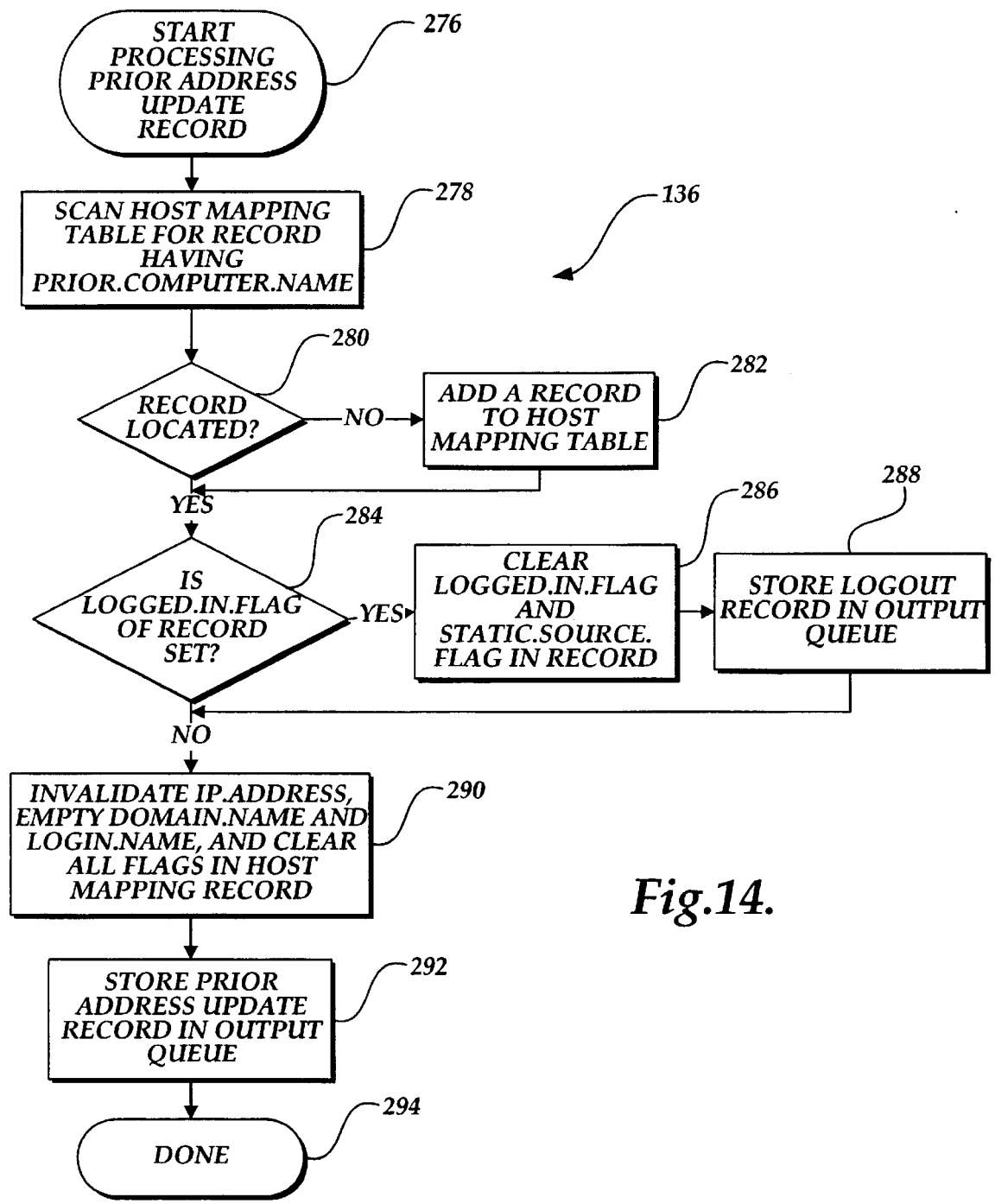
FIG. 14 is a flow chart illustrating the logic used by the naming service manager to process mapping information indicating that an IP address for a computer connected to the LAN shown in FIG. 1 has become obsolete.

The logic used by the naming service manager 46 to process a prior address update record is, shown in more detail in FIG. 14. The logic begins in a block 276 and proceeds to a block 278 in which the naming service manager 46 scans the host mapping table 52 for a record having the prior computer name identified in the prior address update transaction record. In decision block 280, the logic determines if a record in the host mapping table 52 with the same computer name was found. If not, a record is added to the host mapping table 52 including the prior computer name and an invalid IP address. The logged in flag, static source flag and in-use flag are cleared in the newly added record. After a record having the prior computer name identified in the prior address update record is found in the host mapping table 52, or after a record is added to the host mapping table 52, if no such record is already found, the logic proceeds to a decision block 284 in which the naming service manager 46 determines if the logged in flag in the host mapping record just added to or found in the host mapping table 52 is set. In other words, the naming service manager 46 determines if a user is logged into the computer identified by the record from the host mapping table 52.

It will be appreciated that if a prior address update transaction record is received by the naming service manager 46, the naming service manager 46 must update the host mapping table 52 to reflect that the IP address for a computer connected to the LAN 24 has gone out of scope, i.e., that for one reason or another, the computer is no longer associated with the IP address found in the prior address update record. However, if the host mapping table 52 indicates that a user is logged into the computer assigned to the prior IP address, the user must be logged out of the computer at the prior IP address before the mapped record in the host mapping table 52 can be updated. Accordingly, if the result of decision block 284 is positive, the naming service manager 46 clears the logged in flag and the static source flag in the located record of the host mapping table in a block 286. In a block 288 the naming service manager generates and stores a transaction record in the naming service manager output queue that is identified as a logout update record. The logout update record includes the computer name, domain name and IP address of the computer identified in the host mapping record as well as the login name of the user.

Returning to decision block 284, if the logged in flag in the retrieved host mapping record is not set, or if it was set and the appropriate logout transaction record generated, the logic proceeds from decision block 284 to a block 290. In block 290, the naming service manager 46 updates the host mapping table 52 to properly reflect that the IP address for the computer has gone out of scope. More specifically, an invalid IP address is stored in the IP address field of the retrieved host mapping record, while the domain name and login name fields are emptied. In addition, the logged in, static source and in-use flags are cleared. Next, in a block 292, the naming service manager 46 generates and stores a transaction record in the output queue of the naming service manager 46. The transaction record is identified as a prior address update record and includes the IP address and computer name as found in the located host mapping record updated in block 290. The logic then ends in a block 294.

It will be appreciated that as transaction records are added to the naming service manager's output queue, the output queue will output the transaction records in the form of a transaction container 54 to the registered naming service applications 48. In some embodiments of the present invention, certain naming service applications 48 may have registered for only certain types of transaction records, e.g., for only prior address and current address update records or perhaps only login and logout update records. In such cases, the output queue of the naming service manager will send transaction records 53 in the form of transaction containers 54 only to those naming service applications 48 that have registered for those types of records.

Returning to block 136 in FIG. 6B, after the prior address update transaction record has been processed, the logic skips blocks 138–150 and proceeds to a block 152, where the naming service manager 46 obtains the next transaction in the received transaction container 54. The logic then returns to decision block 134 so that the next transaction record 53 can be processed. However, if the transaction record 53 is not a prior address update record, the logic proceeds from decision block 134 to a decision block 138 where the naming service manager 46 determines if the transaction record 53 is a current address update record. If so, the naming service manager 46 processes the current address update record in a block 140. The logic implemented by the naming service manager 46 to process the current address update record is shown in more detail in FIG. 15.

It will be appreciated that when a current address update record is received by the naming service manager 46, the host mapping table 52 must be updated to reflect that a new IP address has been assigned to a computer connected to the LAN 24. Accordingly, the current address update record contains the computer name of the computer and the new or current IP address that has been assigned to the computer. The other fields in the current address update record may contain data, but that data is not necessarily valid.

Figure 15:
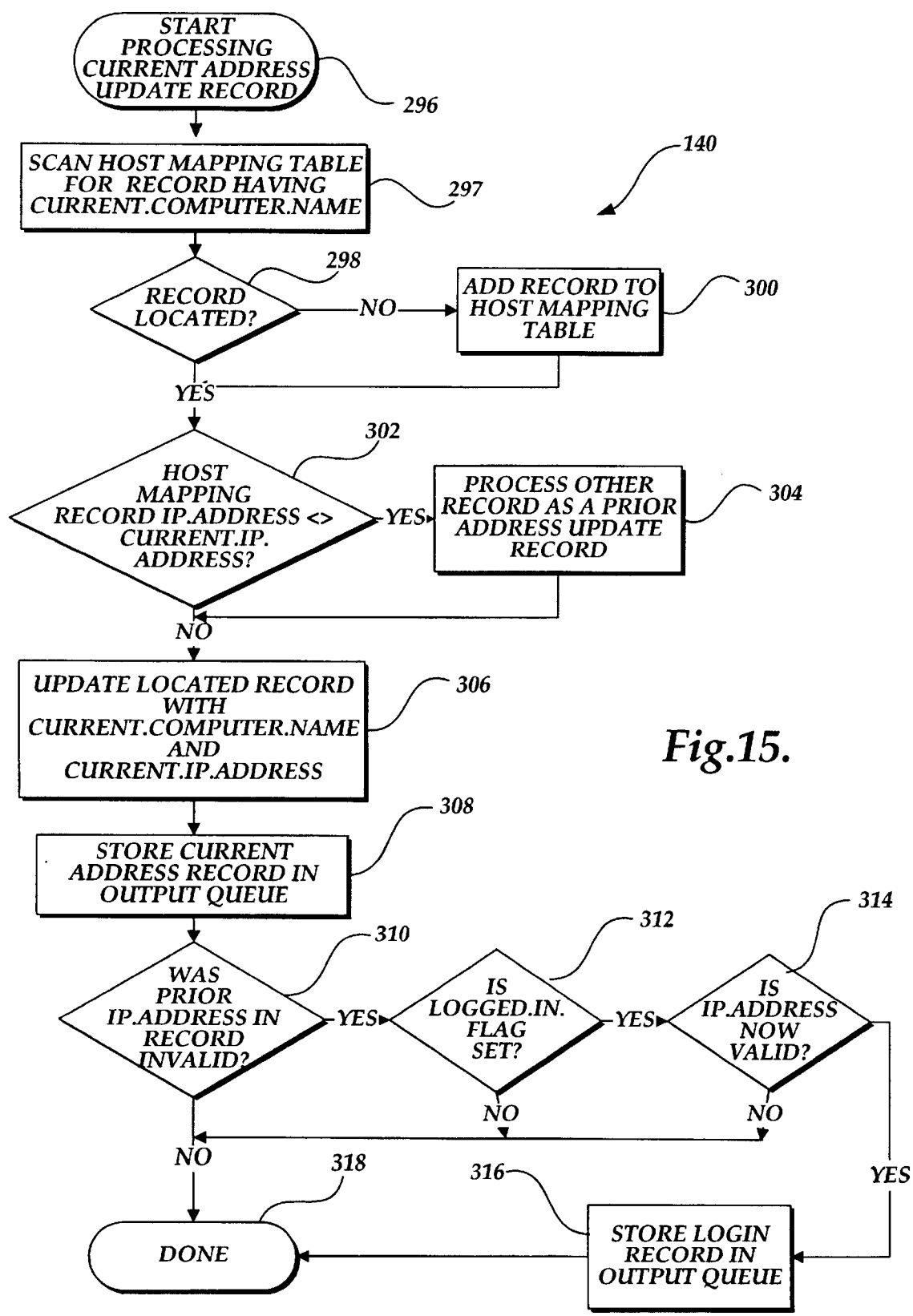
FIG. 15 is a flow chart illustrating the logic used by the naming service manager to process mapping information indicating that a new IP address has been assigned to a computer connected to the LAN shown in FIG. 1.

In this regard, the logic begins in FIG. 15 in a block 296 and proceeds to a block 297 where the naming service manager 46 scans the host mapping table 52 for a record having the same computer name as the current computer name identified in the current address update record. In a decision block 298, the naming service manager 46 determines if such a record has been found in the host mapping table 52. If not, the naming service manager 56 adds a record to the host mapping table 52 with the current computer name identified in the current address update record and an invalid IP address. In addition, all the flags in the record added to the host mapping table 52 are cleared.

If a host mapping record in the host mapping table 52 containing the current computer name is located, or if no such record is found, but a record has been added, the logic proceeds to a decision block 302. In decision block 302, the naming service manager 46 determines if the host mapping record contains a valid IP address different than the current IP address specified in the current address update record. In other words, the naming service manager 46 determines if the computer specified in the host mapping record had a different prior IP address. If so, that assignment must be removed so that the current IP address may be assigned to the computer identified in the current address update record. Consequently, the other record in the host mapping table 52 having the current IP address specified in the current address update record is processed as a prior address update record in a block 304. As a result of processing a record as a prior address update record in accordance with the logic shown in FIG. 14, the IP address found in the host mapping record will be invalidated, thus making the current IP address freely available.

Returning to decision block 302, if there is not another record in the host mapping table 52 having the current IP address, or if such a record exists and has been processed appropriately, the logic proceeds to a block 306 in which the naming service manager 46 updates the host mapping record identified in the host mapping table 52 having the current computer name. More specifically, the current computer name and current IP address specified in the current address update record are stored in the appropriate fields in the identified host mapping record. Next, in a block 308, the naming service manager 46 generates and stores a transaction record in the output queue identified as a current address update record. The current address update record includes the computer name and IP address found in the retrieved host mapping record.

Once the host mapping table 52 has been updated with the current IP address as described above, the naming service manager 46 determines in a block 310 if the IP address in the retrieved host mapping record was an invalid address prior to the update. If not, no further processing is necessary and the logic ends in a block 318. However, if the prior IP address was invalid, the change to the current IP address may signify that a user has logged in, but generation of a login update record has been deferred until a valid IP address has been assigned. In this regard, the logic proceeds from decision block 310 to a decision block 312 where the naming service manager 46 determines if the logged in flag in the identified host mapping record is set. If not, a user has not logged into the identified computer so a login record is not necessary. Consequently, the logic merely ends in block 318. However, if the logged in flag in the host mapping record is set, a user has logged in and thus, it may be necessary to output a login record. Accordingly, the logic determines in a block 314 if the IP address in the host mapping record is now a valid IP address, i.e., the IP address in the host mapping record has changed from an invalid address to a valid address. If not, the IP address is still invalid, and a login update record in not required. However, if the IP address is now a valid one, the logic proceeds to a block 316 where it generates and stores a transaction record 53 in the naming service manager's output queue. The transaction record is identified as a login record and contains the computer name, IP address, domain name and login name found in the host mapping record. The logic then ends in a block 318.

Returning to FIG. 6B, once the current address update record has been processed in block 140, the naming service manager obtains the next transaction record 53 in the transaction container 54 received in block 152 so that the naming service manager 46 can process the next transaction record.

Figure 16:
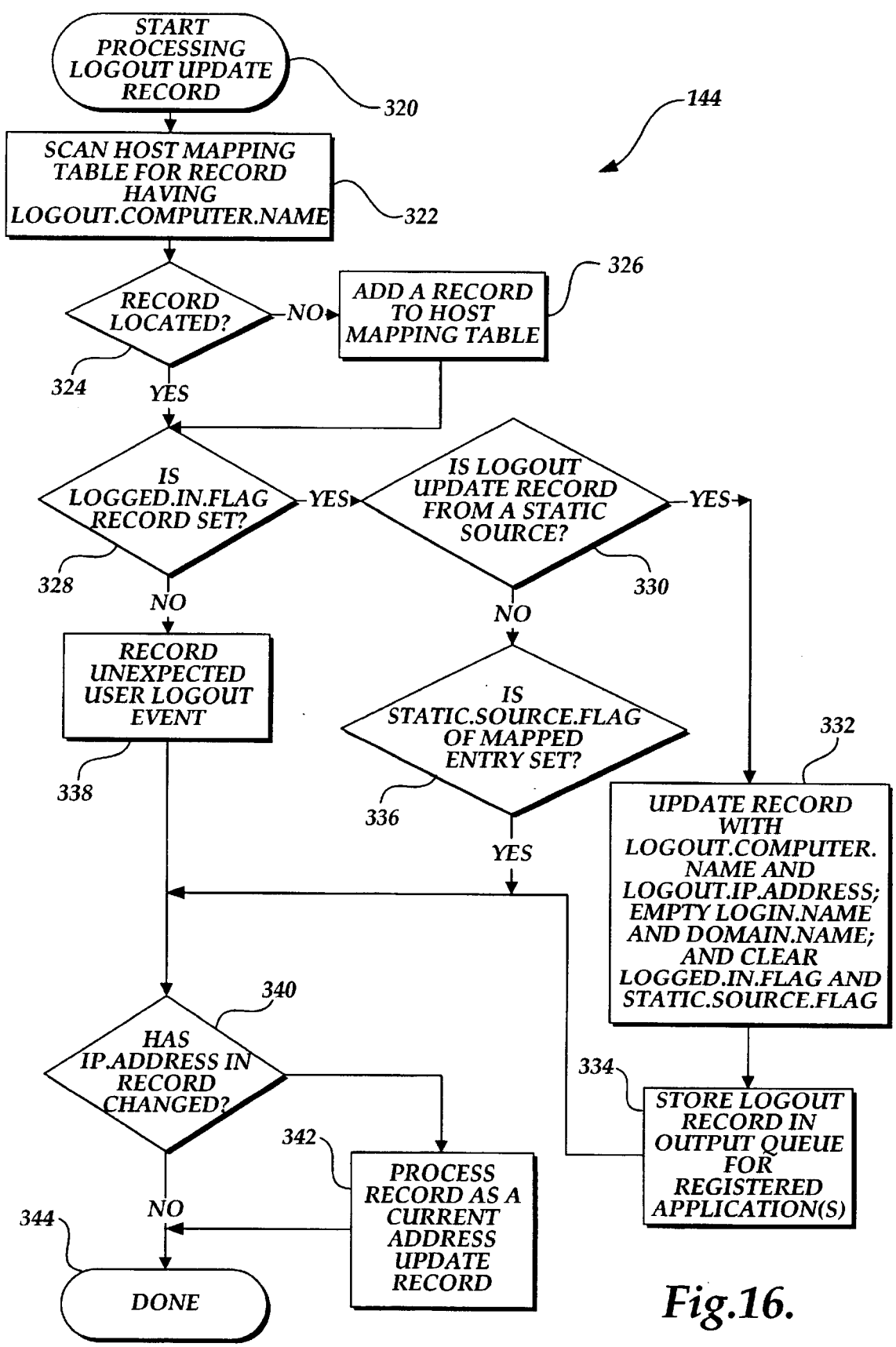
FIG. 16 is a flow chart illustrating the logic used by the naming service manager to process mapping information indicating that a network user has logged out of a computer connected to the LAN shown in FIG. 1.

Returning to decision block 138, if the transaction 53 record is not a current address update record, the naming service manager 46 determines if the transaction record is a logout update record in a decision block 142. If so, the logout update record is processed in a block 144. The logic implemented by the naming service manager 46 to process the logout update record is shown in more detail in FIG. 16. The logout update record contains the login name of the user logging out and the domain name, computer name and IP address of the computer from which the user is logging out. The logic begins in a block 320 and proceeds to a block 322 where the naming service manager 46 scans the host mapping table 52 for a record having the same computer name as the computer name identified by the logout record. In a decision block 324, the naming service manager 46 determines if such a host mapping record is found. If not, the naming service manager 46 adds a record to the host mapping table 52 containing the logout computer name, and an invalid IP address. In addition, all the flags in the added record are cleared.

If a record having the logout computer name is found in the host mapping table 52 or such a record has been added to the host mapping table 52, the logic proceeds to a decision block 328 where the naming service manager 46 determines if the logged in flag of the host mapping record is set. In other words, the naming service manager 46 determines if a user has already logged in to the computer identified in the host mapping record. If the host mapping table 52 reflects that the user is not already logged into the computer, then an unexpected user logout event has occurred, and the naming service manger records the unexpected event in a block 338. However, if the result of decision block 328 is positive, and as expected, a user is logged into the computer identified in the logout update record, the logic proceeds to a decision block 330 where the naming service manager 46 determines if the logout update record was received from a static source of mapping information.

If the logout update record was received from a static source, the naming service manager 46 is permitted to update the host mapping table 52 with the logout information because mapping information provided by a static source is allowed to be overwritten by updated information from a similar static source. However, if the logout update record was received from a dynamic source of mapping information, the naming service manager will only be permitted to update the host mapping record with the logout information if the mapping information in the host mapping record was not provided by a static source in the first place. In other words, mapping information provided by a static source is not allowed to be overwritten with mapping information provided by a dynamic source. Hence, if the result of decision block 330 is positive, the host mapping record is updated with the computer name and IP address specified by the logout update record, while the login name and domain name in the host mapping record are emptied in a block 332. In addition, the logged in flag and static source flag are cleared. Next, in a block 334, the naming service manager 46 generates and stores a transaction record in the naming service manager's output queue identified as a logout update record and containing the mapping information from the updated host mapping record.

Returning to decision block 330, if the logout update record was not received from a static source, the naming service manager must determine whether the mapping information in the host mapping record was originally provided by a dynamic source or a static source. If provided by a dynamic source, i.e., if the static source flag in the host mapping record is not set, the host mapping record is updated as described above in block 332 and a logout record is stored in the output queue in block 334. On the other hand, if the mapping information in the host mapping record was provided by a dynamic source, i.e., the static source flag in the host mapping record is set, the logic skips blocks 332 and 334 and the host mapping record is not updated, and a logout record is not generated. The logic merely proceeds to a decision block 340. In decision block 340, the naming service manager 46 determines if the IP address in the host mapping record has changed during processing of the logout update record. If so, a new IP address has been provided and thus the host mapping record must be processed as a current address update record in accordance with the logic shown in FIG. 15 in a block 342. If the IP address has not changed or if the host mapping record has been processed as a current address update record, the logic ends in a block 344.

Returning to FIG. 6B, after the logout transaction record has been processed in block 144, the naming service manager obtains the next transaction in the transaction container 54 received in block 152 so that the naming service manager 46 can process the next transaction record 53.

Figure 17A:
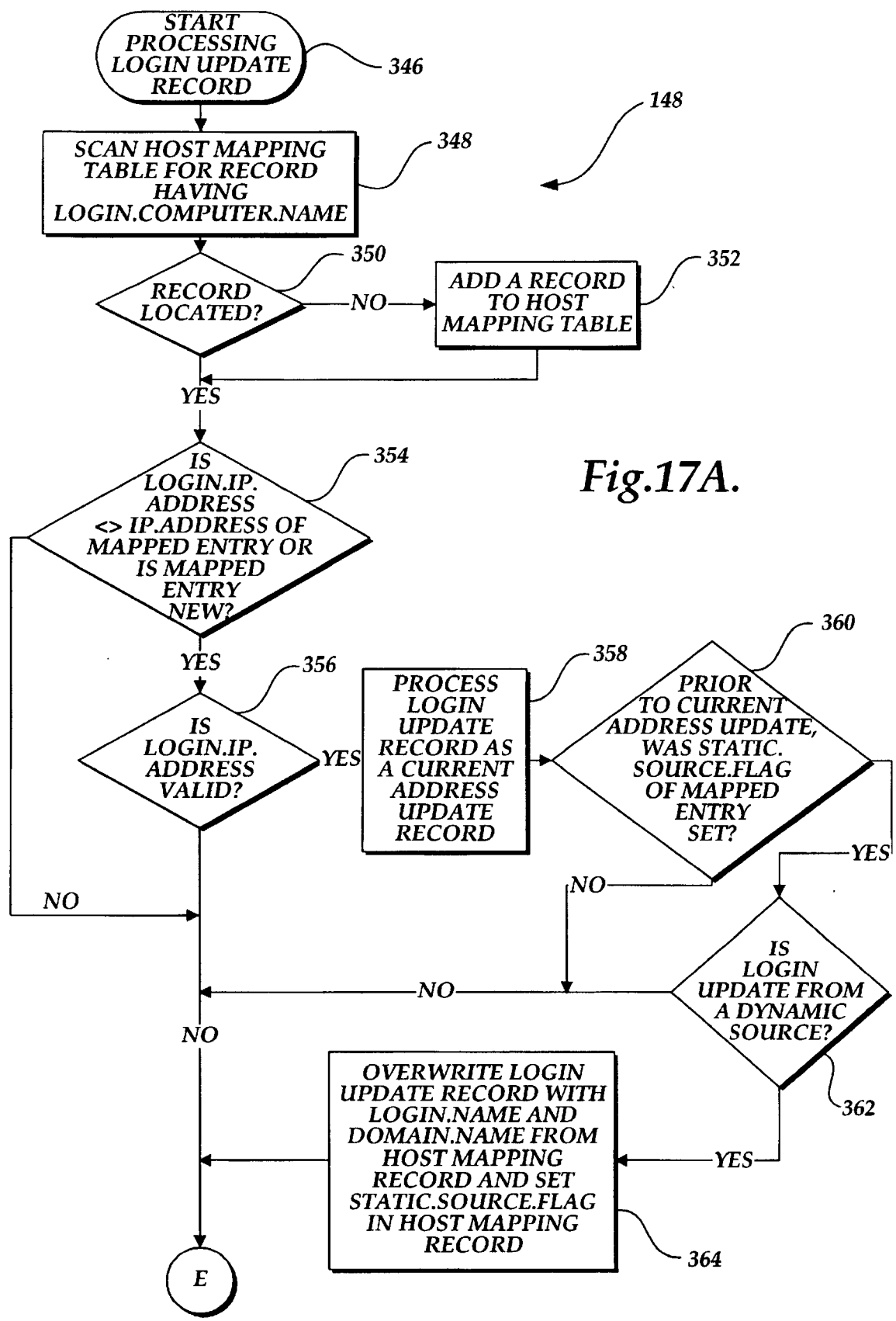
FIGS. 17A and 17B are a flow chart illustrating the logic used by the naming service manager to process mapping information indicating that a network user has logged into a computer connected to the LAN shown in FIG. 1.

Returning to decision block 142, if the transaction record 53 is not logout update record, the naming service manager 46 determines if the transaction record 53 is a login update record in a decision block 146. If so, the naming service manager processes the login update record in a block 148. The logic implemented by the naming service manager 46 to process the login update record is shown in more detail in FIGS. 17A and 17B. The login update record contains the login name of the user logging in and the domain name, computer name and IP address of the computer to which the user is logging in. The logic begins in FIG. 17A in a block 346 and proceeds to a block 348 in which the naming service manager 46 scans the host mapping table 52 for a record having the computer name stored in the login update record. In a decision block 350, the logic determines if the naming service manager 46 has found such a host mapping record in the host mapping table 52. If not, the naming service manager 46 adds a record to the host mapping table 52 containing the login computer name, and an invalid IP address in a block 352. In addition, all the flags in the added record are cleared.

If a record having the login computer name is found in the host mapping table 52 or if such a record has been added to the host mapping table 52, the logic proceeds to a decision block 354 where the naming service manager 46 determines if the IP address in the login update record is different than the IP address identified in the host mapping record or if the IP address identified in the login record is a new IP address that cannot be found in the host mapping table 52. If either of these conditions is met, then the computer identified by the computer name stored in the host mapping record and the login update record has been assigned a new IP address and the host mapping table 52 must be updated accordingly. However, in order to avoid unnecessary processing, the naming service manager 46 determines if the login IP address is valid in a decision block 356 before further processing the new IP address. Hence, if the login IP address is new or changed and is valid, the login updated record is processed as a current address update record in a block 358. As a result of the logic illustrated in FIG. 15, the host mapping record having the computer name specified in the login update record is updated to the login IP address.

After the login update record is processed as a current address update record, the logic proceeds to a decision block 360. In decision block 360, the naming service manager 46 determines if, prior to the current address update, the static source flag of the host mapping record was set, i.e., if the mapping information found in the host mapping record was originally provided by a static source of mapping information. If so, the naming service manager 46 will only allow the host mapping record to be completely overwritten with new login information if the login update record was provided by another static source. In this regard, the naming service manager 46 determines in a decision block 362 if the login update record came from a dynamic source of mapping information, e.g., domain controller agent 64, rather than a static source. If so, the naming service manager 46 overwrites the login name identified in the login update record with the login name found in the host mapping record that was originally provided by the static source of mapping information.

Figure 17B:
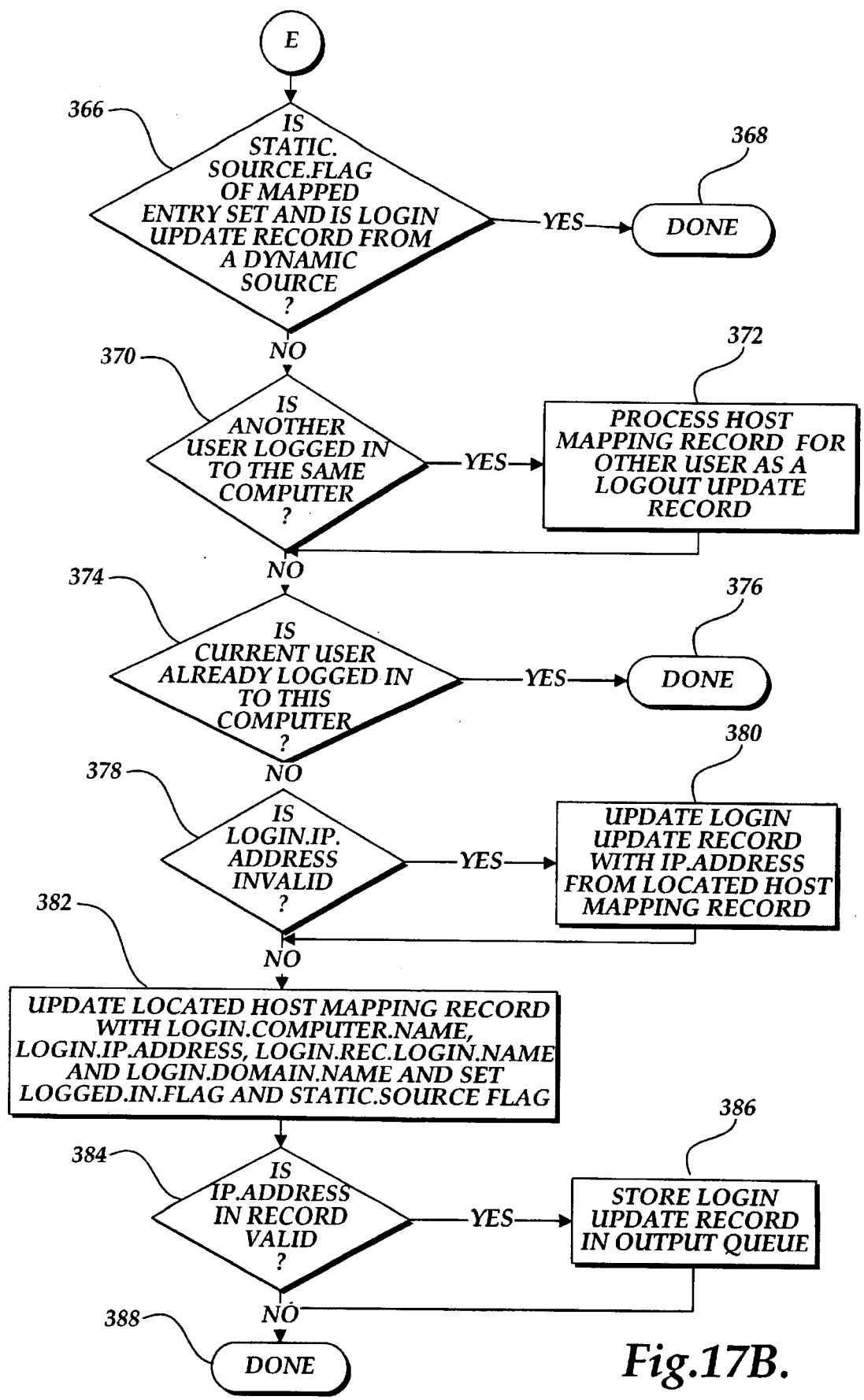

Returning to decision block 354, if the IP address in the login update record is the same as that in the host mapping record, or if it is invalid, there is no need to process the login update record as a current address update record and the logic proceeds directly to a decision block 366 in FIG. 17B. In addition, referring to decision block 360, if the mapping information in the host mapping record was not originally provided by a static source or if the login update record was not received from a dynamic source, there is no need to overwrite the login name specified in the login update record and the logic also proceeds directly to decision block 366.

In decision block 366, the logic determines if the current static source flag in the host mapping record is set (i.e., if the mapping information in the record was provided by a static source of mapping information), and if the login update record was received from a dynamic source such as domain controller agent 64. If so, the mapping information in the host mapping record cannot be overwritten with the mapping information in the login updated record, so the logic ends in a block 368. Otherwise, the logic proceeds to a decision block 370 in which it determines if another user is logged in to the same computer. More specifically, the naming service manager 46 determines if the host mapping record contains a login name different than the login name specified by the logout update record. If so, the other host mapping record is processed as a user logout update in a block 372 so that the host mapping table 52 reflects that the other user has logged out.

If the result of decision block 370 is negative or if the host mapping record has been processed as a logout update record, the logic proceeds to a decision block 374. In decision block 374, the naming service manager determines if the user identified in the login update record has already logged in to the computer identified in the login update record. In other words, the naming service manager 74 determines if the logged in flag in the host mapping record is set. If so, the logic merely ends in a block 376.

Returning to decision block 376, if the user identified in the login update record is not already logged in to the same computer, the logic determines in a block 378 if the IP address provided in the login update record is invalid. If so, the login update record is updated in a block 380 with the IP address in the host mapping record.

Returning to decision block 378, if the IP address provided in the login update record is valid, the logic proceeds to a block 382. In a block 382, the naming service manager 46 updates the host mapping record with the computer name, IP address, login name and domain name specified in the login update record. In addition, the logged in flag is set and the static source flag is set or cleared to reflect the source of the login update record, i.e., a dynamic source of mapping information or a static source of mapping information. Next, in a decision block 384, the naming service manager 46 determines if the IP address in the host mapping record updated in block 382 is valid, if not, the naming service manager 46 defers generating and outputting a login update record to the naming service applications 48 until a valid IP address is assigned during a current address update as described above. Consequently, the logic ends in a block 388. However, if the IP address in the host mapping record is valid, the naming service manager 46 finally generates a login update record containing the computer name, IP address, domain name and login name from the host mapping record in a block 386. The logic then ends in block 388.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-readable medium having computer-executable components for mapping users of a network connecting a plurality of computers, to the computers of the network, the computer-readable medium having computer-executable components comprising:
    (a) a manager for maintaining mapping information for each user of the network and for each computer connected to the network; and
    (b) at least one agent for providing updated mapping information collected from the plurality of computers to the manager as users of the network change and addresses of computers connected to the network change, wherein the manager updates the mapping information with the updated mapping information provided by said at least one agent.

2. The computer-readable medium of claim 1 having a further computer-executable component comprising at least one application for receiving updated mapping information from the manager, wherein said at least one application processes the updated mapping information in accordance with application requirements.

3. The computer-readable medium of claim 2, wherein the mapping information for each user identifies a login name of the user and a computer name of the computer to which the user is mapped.

4. The computer-readable medium of claim 3, wherein the mapping information for each computer identifies the computer name of the computer to which the user is mapped and the address of the computer connected to the network.

5. The computer-readable medium of claim 4, wherein the at least one agent provides the manager with a prior address update to the mapping information for each computer when the address for the computer becomes obsolete, and wherein the prior address update includes the obsolete address and computer name for the computer.

6. The computer-readable medium of claim 5, wherein when the manager is provided the prior address update by the at least one agent, the manager updates the mapping information for the computer with the obsolete address and computer name for the computer.

7. The computer-readable medium of claim 6, wherein the at least one agent provides the manager with a current address update to the mapping information for each computer when the computer is assigned a new address, and wherein the current address update includes the new address and computer name for the computer.

8. The computer-readable medium of claim 7, wherein when the manager is provided the current address update by the at least one agent, the manager updates the mapping information for the computer with the new address and computer name for the computer.

9. The computer-readable medium of claim 8, wherein the at least one agent provides the manager with a logout update to the mapping information for each user and each computer as each user logs out of a computer connected to the network, wherein the logout update includes the login name of the user logging out of the computer, and the address and computer name of the computer out of which the user is logging.

10. The computer-readable medium of claim 9, wherein when the manager is provided the logout update by the at least one agent, the manager updates the mapping information for the computer and the user with the login name of the user logging out of the computer, and the address and computer name of the computer out of which the user is logging.

11. The computer-readable medium of claim 10, wherein the at least one agent provides the manager with a login update to the mapping information for each user and each computer as each user logs into a computer connected to the network, wherein the login update includes the login name of the user logging into the computer and the address and computer name of the computer into which the user is logging.

12. The computer-readable medium of claim 11, wherein when the manager is provided the login update by the at least one agent, the manager updates the mapping information for the computer and the user with the login name of the user logging into the computer and the address and computer name of the computer into which the user is logging.

13. The computer-readable medium of claim 12, wherein if the computer into which the user is logging h as a new address, the manager processes a current address update for the computer.

14. The computer-readable medium of claim 13, wherein if another user is logged into the computer identified by the login update provided by the at least one agent, the manager processes a logout update for the other user.

15. The computer-readable medium of claim 10, wherein if the computer out of which the user is logging has a new address, the manager processes a current address update for the computer.

16. The computer-readable medium of claim 8, wherein prior to updating the mapping information with the new address and computer name for the compute, the manager processes a prior address update for the former address for the computer because the former address of the computer has become obsolete.

17. The computer-readable medium of claim 1, wherein the at least one agent provides the manager with static updated mapping information for each user.

18. The computer-readable medium of claim 17, wherein at least one other agent provides the manager with dynamic updated mapping information for each user.

19. The computer-readable medium of claim 18, wherein the manager does not update static mapping information provided by the at least one agent with dynamic updated mapping information provided by the at least one other agent.

20. A method for resolving a plurality of users of a network connecting a plurality of computers to at least one of the computers connected to the network, the method comprising:
    (a) establishing for each user a computer-to-user mapping, which maps the user to at least one of the computers connected to the network;
    (b) establishing for each computer connected to the network a computer-to-address mapping, which maps the computer to a network address;

(c) updating the computer-to-user mapping for each user as the user logs into and out of the at least one computer; and (d) updating the computer-to-address mapping for each computer as the network address for the computer changes.

21. The method of claim 20, further comprising communicating to at least one application, the computer-to-user mapping of each user, the computer-to-address mapping for each computer to a network address, and the update of each said mapping, wherein said at least one application processes said mappings and said updates in accordance with application requirements.

22. The method of claim 21, further comprising storing the computer-to-address mapping for each computer and the computer-to-user mapping for each user mapped to the computer as a record in a host mapping table.

23. The method of claim 22, wherein updating the computer-to-user mapping of each user as the user logs into and out of the at least one computer comprises:

(a) identifying each newly active computer and each newly inactive computer connected to the network by computer name and network address;

(b) generating a login update for each newly active computer, wherein the login update includes the computer name and network address of the newly active computer and a login name of the user who logged in to the computer;

(c) generating a logout update for each newly inactive computer, wherein the logout update includes the computer name and network address of the newly inactive computer and the login name of the user who logged out of the computer.

24. The method of claim 23, wherein updating the computer-to-address mapping for each computer as the network address for the computer changes comprises:

(a) identifying each newly active computer by computer name and new network address;

(b) identifying each newly inactive computer by computer name and former network address;

(c) identifying each active computer whose network address has changed by computer name and new network address;

(d) for each newly active computer, generating a current address update, wherein the current address update includes the computer name and new network address of the newly active computer;

(e) for each newly inactive computer, generating a prior address update, wherein the prior address update includes the computer name and former network address of the newly inactive computer; and (f) for each active computer whose network address has changed, generating a prior address update including the computer name and former network address of the active computer, and a current address update including the computer name and new network address of the active computer.

25. The method of claim 24, further comprising processing each prior address update, wherein processing each prior address update comprises:

(a) locating a record in the host mapping table containing a computer name which matches the computer name in the prior address update;

(b) storing the computer name and an invalid network address of the computer identified in the prior address update in said record in the host mapping table; and (c) sending a prior address update record to the at least one application containing the computer name and the invalid network address of said computer.

26. The method of claim 25, further comprising processing each current address update, wherein processing each current address update comprises:

(a) locating a record in the host mapping table containing a computer name which matches the computer name in the current address update;

(b) storing the computer name and the new network address of the computer identified in the current address update in said record in the host mapping table; and (c) sending a current address update record to the at least one application containing the computer name and the new network address of said computer.

27. The method of claim 26, further comprising processing each logout update, wherein processing each logout update comprises:

(a) locating a record in the host mapping table containing a computer name which matches the computer name in the logout update;

(b) storing the computer name and network address of the computer identified in the logout update and the login name of the user who logged out of said computer in said record in the host mapping table; and (c) sending a logout record to the at least one application containing the computer name and the network address of said computer and the login name of the user who logged out of said computer.

28. The method of claim 27, further comprising processing each login update, wherein processing each login update comprises:

(a) locating a record in the host mapping table containing a computer name which matches the computer name in the login update;

(b) storing the computer name and network address of the computer identified in the login update and the login name of the user who logged into said computer in said record in the host mapping table; and (c) sending a login record to the at least one application containing the computer name and the network address of said computer and the login name of the user who logged into said computer.

29. The method of claim 28, wherein if the computer-to-user mapping and the computer-to-address mapping in said record are permanent, the computer name and network address of the computer identified in the login update and the login name of the user who logged into said computer are not stored in said record in the host mapping table and a login record is not sent.

30. The method of claim 29, wherein processing the login update further comprises processing a current address update for the computer identified in the login update if the network address of said computer has changed.

31. The method of claim 27, wherein processing the logout update further comprises processing a prior address update for the computer identified in the logout update if the network address of said computer has changed.

32. The method of claim 27, wherein if the computer-to-user mapping and the computer-to-address mapping in said record are permanent, the computer name and network address of the computer identified in the login update and the login name of the user who logged out of said computer is not stored in said record in the host mapping table and a logout record is not sent.

33. The method of claim 26, wherein processing the current address update further comprises processing a prior address update for the computer identified in the current address update prior to storing the computer name and the new network address of said computer in said record in the host mapping, table, if the new address of said computer is different that a former address of said computer.

34. The method of claim 33, wherein processing the current address update further comprises sending a login record to the at least one application, if the former address of the computer identified in the current address update was an invalid network address and the user is not currently logged into said computer, wherein the login record includes the login name of the user and the computer name and network address of said computer.

35. The method of claim 25, wherein processing the prior address update further comprises sending a logout record to the at least one application if the user mapped to the computer identified in the prior address update was currently logged into the newly inactive computer, wherein the logout record includes the login name of the user and the computer name and former network address of said computer.

36. An apparatus for mapping users of a network connecting a plurality of computers, to the computers of the network, the apparatus comprising:

(a) a storage medium for storing a manager for maintaining mapping information for each user of the network and for each computer connected to the network, wherein the manager is provided updated mapping information from at least one agent which collects the updated mappimg information from the plurality of computers, and wherein the manager updates the mapping information with the updated mapping information provided by said at least one agent; and (b) a processing unit electronically coupled to the storage medium for executing program instructions which implement the manager.

37. The apparatus of claim 36, wherein the processing unit executes program instructions causing the manager to communicate the mapping information for each user and computer to at least one application, wherein the at least one application processes the mapping information in accordance with application requirements.

38. The apparatus of claim 37, wherein the mapping information for each user identifies a login name of the user and a computer name of the computer to which the user is mapped.

39. The apparatus of claim 38, wherein the mapping information for each computer identifies the computer name of the computer to which the user is mapped and the address of the computer connected to the network.

40. The apparatus of claim 39, wherein when the manager is provided the prior address update by the at least one agent, the manager updates the mapping information for the computer with the obsolete address and computer name for the computer.

41. The apparatus of claim 40, wherein the at least one agent provides the manager with a current address update to the mapping information for each computer when the computer is assigned a new address, and wherein the current address update includes the new address and computer name for the computer.

42. The apparatus of claim 41, wherein when the manager is provided the current address update by the at least one agent, the manager updates the mapping information for the computer with the new address and computer name for the computer.

43. The apparatus of claim 42, wherein the at least one agent provides the manager with a logout update to the mapping information for each user and each computer as each user logs out of a computer corrected to the network, wherein the logout update includes the login name of the user logging out of the computer and the address and computer name of the computer out of which the user is logging.

44. The apparatus of claim 43, wherein when the manager is provided the logout update by the at least one agent, the manager updates the mapping information for the computer and the user with the login name of the user logging out of the computer and the address and computer name of the computer out of which the user is logging.

45. The apparatus of claim 44, wherein the at least one agent provides the manager with a login update to the mapping information for each user and each computer as each user logs into a computer connected to the network, wherein the login update includes the login name of the user logging into the computer and the address and computer name of the computer into which the user is logging.

46. The apparatus of claim 45, wherein when the manager is provided the login update by the at least one agent, the manager updates the mapping information for the computer and the user with the login name of the user logging into the computer and the address and computer name of the computer into which the user is logging.

47. The apparatus of claim 46, wherein if the computer into which the user is logging has a new address, the manager provides a current address update for the computer.

48. The apparatus of claim 47, wherein if another user is logged into the computer identified by the login update provided by the at least one agent, the manager provides a logout update for the other user.

49. The apparatus of claim 44, wherein if the computer out of which the user is logging has a new address, the manager provides a current address update for the computer.

50. The apparatus of claim 42, wherein the manager provides a prior address update for the former address for the computer.

51. The apparatus of claim 39, wherein the at least one agent provides the manager with a prior address update to the mapping information for each computer when the address for the computer becomes obsolete, and wherein the prior address update includes the obsolete address and computer name for the computer.

52. The apparatus of claim 36, wherein the network connecting the plurality of computers is connected to an internetwork, and wherein the address of each of the plurality of computers comprises an internetwork protocol address.

\* \* \* \* \*